US012617622B2

(12) United States Patent
Raikar et al.

(10) Patent No.: US 12,617,622 B2
(45) Date of Patent: May 5, 2026

(54) CONVEYOR ASSEMBLY AND METHOD OF USING THE SAME

(71) Applicant: INTELLIGRATED HEADQUARTERS, LLC, Mason, OH (US)

(72) Inventors: Venkatesh Raikar, Charlotte, NC (US); Saravanan Sadasivan, Charlotte, NC (US); Sourabh Painjane, Charlotte, NC (US)

(73) Assignee: Intelligrated Headquarters, LLC, Mason, OH (US)

( * ) Notice: Subject to any disclaimer, the term of this patent is extended or adjusted under 35 U.S.C. 154(b) by 201 days.

(21) Appl. No.: 18/524,935

(22) Filed: Nov. 30, 2023

(65) Prior Publication Data

US 2024/0199337 A1     Jun. 20, 2024

(30) Foreign Application Priority Data

Dec. 20, 2022     (IN) .............................. 202211073869

(51) Int. Cl.
*B65G 13/06* (2006.01)
*B65G 43/00* (2006.01)

(52) U.S. Cl.
CPC .............. *B65G 13/06* (2013.01); *B65G 43/00* (2013.01); *B65G 2203/0266* (2013.01)

(58) Field of Classification Search
CPC . B65G 2203/0266; B65G 43/00; B65G 13/06
USPC .................................. 198/577, 343.1, 781.01
See application file for complete search history.

(56) References Cited

U.S. PATENT DOCUMENTS

| | | | | |
|---|---|---|---|---|
| 6,378,694 B1 * | 4/2002 | Onoyama | .............. | B65G 47/31 |
| | | | | 198/781.06 |
| 6,459,224 B2 * | 10/2002 | Itoh | ........................ | B65G 47/31 |
| | | | | 318/400.14 |
| 6,820,736 B2 * | 11/2004 | Itoh | ........................ | B65G 47/31 |
| | | | | 198/781.01 |

(Continued)

FOREIGN PATENT DOCUMENTS

| | | |
|---|---|---|
| EP | 0614830 A1 | 9/1994 |
| JP | 07-172549 A | 7/1995 |

(Continued)

*Primary Examiner* — Gene O Crawford
*Assistant Examiner* — Lester Rushin, III
(74) *Attorney, Agent, or Firm* — Alston & Bird LLP

(57)     ABSTRACT

Various embodiments are directed to a conveyor assembly and method of using the same. In various embodiments, a conveyor assembly comprises a plurality of rollers configured to facilitate transportation of an object on a conveyor surface, the plurality of rollers comprising a first drive roller operable to rotate in a first rotational direction to cause a movement of the conveyance surface in a conveyance direction; and a second roller configured for rotation in a second rotational direction opposite the first rotational direction to generate a counterforce that opposes the movement of the conveyor surface in the conveyance direction; and a controller configured to control the first drive roller and a secondary motor operable to drive rotation of the second roller in the second rotational direction to stop the movement of the conveyor surface such that the object disposed thereon is stopped at a stop position defined within the conveyor zone.

19 Claims, 10 Drawing Sheets

(56)  References Cited

U.S. PATENT DOCUMENTS

| | | | |
|---|---|---|---|
| 7,360,638 B2 | 4/2008 | Ko et al. | |
| 8,843,010 B2 * | 9/2014 | Okuno | G03G 15/2064 |
| | | | 399/67 |
| 10,654,659 B2 * | 5/2020 | Combs | G05B 19/4189 |
| 10,894,668 B1 * | 1/2021 | Zimmer | B65G 13/11 |
| 2010/0058098 A1 | 3/2010 | Saitou et al. | |

FOREIGN PATENT DOCUMENTS

| | | | |
|---|---|---|---|
| JP | 2010-052900 A | 3/2010 | |
| JP | 4721158 B2 | 7/2011 | |

* cited by examiner

Figure 9:
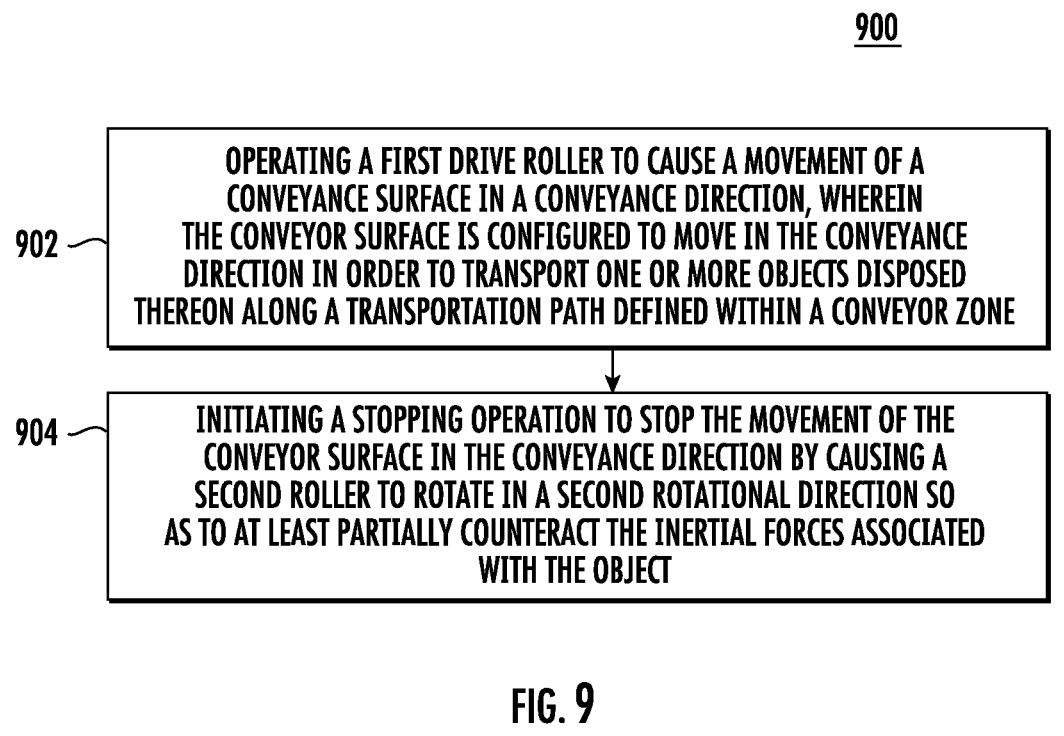

900

| OPERATING A FIRST DRIVE ROLLER TO CAUSE A MOVEMENT OF A CONVEYANCE SURFACE IN A CONVEYANCE DIRECTION, WHEREIN THE CONVEYOR SURFACE IS CONFIGURED TO MOVE IN THE CONVEYANCE DIRECTION IN ORDER TO TRANSPORT ONE OR MORE OBJECTS DISPOSED THEREON ALONG A TRANSPORTATION PATH DEFINED WITHIN A CONVEYOR ZONE |

902

| INITIATING A STOPPING OPERATION TO STOP THE MOVEMENT OF THE CONVEYOR SURFACE IN THE CONVEYANCE DIRECTION BY CAUSING A SECOND ROLLER TO ROTATE IN A SECOND ROTATIONAL DIRECTION SO AS TO AT LEAST PARTIALLY COUNTERACT THE INERTIAL FORCES ASSOCIATED WITH THE OBJECT |

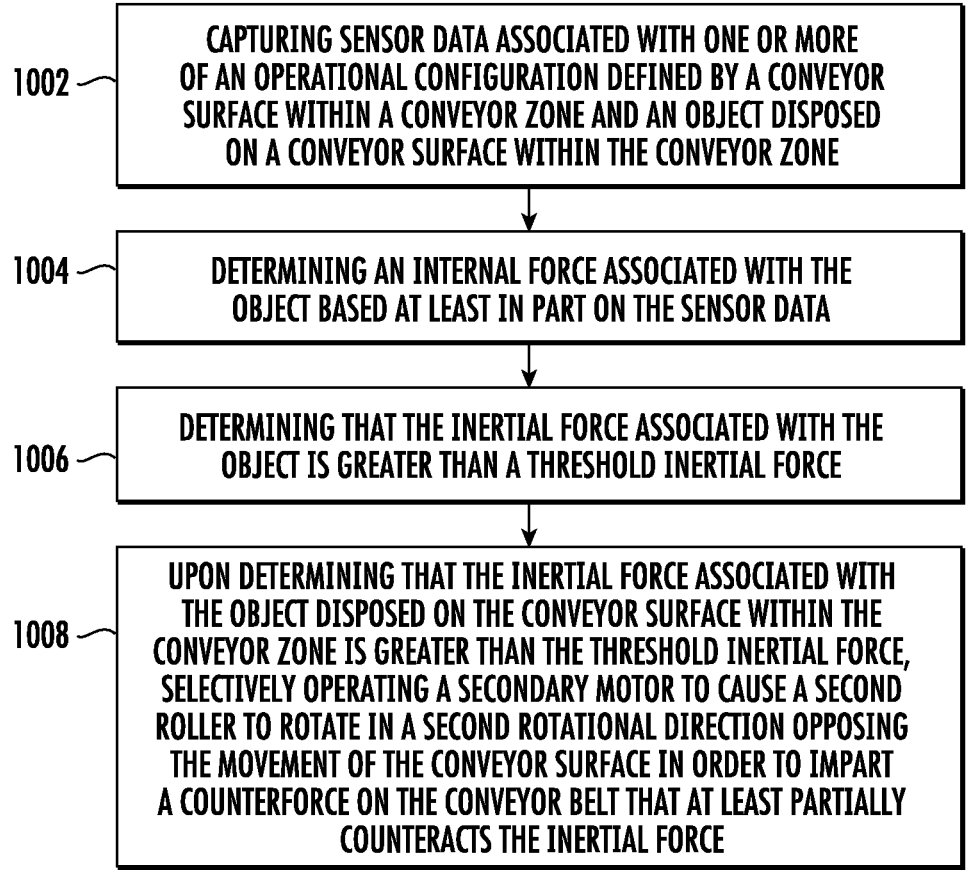

1000

1002 — CAPTURING SENSOR DATA ASSOCIATED WITH ONE OR MORE OF AN OPERATIONAL CONFIGURATION DEFINED BY A CONVEYOR SURFACE WITHIN A CONVEYOR ZONE AND AN OBJECT DISPOSED ON A CONVEYOR SURFACE WITHIN THE CONVEYOR ZONE

1004 — DETERMINING AN INTERNAL FORCE ASSOCIATED WITH THE OBJECT BASED AT LEAST IN PART ON THE SENSOR DATA

1006 — DETERMINING THAT THE INERTIAL FORCE ASSOCIATED WITH THE OBJECT IS GREATER THAN A THRESHOLD INERTIAL FORCE

1008 — UPON DETERMINING THAT THE INERTIAL FORCE ASSOCIATED WITH THE OBJECT DISPOSED ON THE CONVEYOR SURFACE WITHIN THE CONVEYOR ZONE IS GREATER THAN THE THRESHOLD INERTIAL FORCE, SELECTIVELY OPERATING A SECONDARY MOTOR TO CAUSE A SECOND ROLLER TO ROTATE IN A SECOND ROTATIONAL DIRECTION OPPOSING THE MOVEMENT OF THE CONVEYOR SURFACE IN ORDER TO IMPART A COUNTERFORCE ON THE CONVEYOR BELT THAT AT LEAST PARTIALLY COUNTERACTS THE INERTIAL FORCE

FIG. 10

CONVEYOR ASSEMBLY AND METHOD OF USING THE SAME

CROSS-REFERENCE TO RELATED APPLICATIONS

This application claims priority pursuant to 35 U.S.C. 119(a) to Indian Application No. 202211073869, filed Dec. 20, 2022, which application is incorporated herein by reference in its entirety.

FIELD OF THE INVENTION

Example embodiments of the present invention relates generally to a material handling system for handling items, and, more particularly, to motorized rollers for use in controlling a conveyor a surface within conveyor assembly.

BACKGROUND

Conveyor systems and assemblies may be used in industrial manufacturing and packing applications, for example, to facilitate the transportation of a large number of objects to a desired destination within a factory or a warehouse. These conveyor systems and assemblies often utilize one or more motorized drive rollers to drive movement of a conveyor surface upon which the objects are disposed to transport the objects along a transportation path defined by the conveyor assembly. Many conveyor assemblies are plagued by technical challenges and limitations. Through applied effort, ingenuity, and innovation, the problems identified herein have been solved by developing solutions that are included in embodiments of the present disclosure, many examples of which are described in detail herein.

BRIEF SUMMARY

Various embodiments are directed to a conveyor assembly and method of using the same. In various embodiments, a conveyor assembly configured for transporting an object along a transportation path may comprise a plurality of rollers configured to facilitate transportation of an object disposed on a conveyor surface through a conveyor zone, wherein the plurality of rollers comprises: a first drive roller selectively operable to rotate in a first rotational direction to cause a movement of the conveyance surface in a conveyance direction to move the object along a transportation path defined within the conveyor zone; and a second roller configured to be selectively rotated in a second rotational direction opposite the first rotational direction in order to generate a counterforce that opposes the movement of the conveyor surface in the conveyance direction; and a controller configured to generate one or more control signals configured to control the first drive roller and a secondary motor operable to drive rotation of the second roller in the second rotational direction; wherein the conveyor assembly is configured to execute a stopping operation by selectively causing the second roller to rotate in the second rotational direction to stop the movement of the conveyor surface such that the object disposed thereon is stopped at a stop position defined within the conveyor zone.

In various embodiments, the conveyor surface may be defined by a conveyor belt disposed within the conveyor zone, the conveyor belt being engaged with at least a portion of the plurality of rollers such that a first rotation of the first drive roller causes a first force to be imparted on the conveyor belt in a first linear direction and a second rotation of the second roller causes the counterforce to be imparted on the conveyor belt in a second linear direction opposite the first linear direction. In various embodiments, the conveyor assembly may further comprise one or more sensor elements configured to capture sensor data associated with one or more of the object disposed on the conveyor surface and an operational configuration defined by the conveyor surface within conveyor zone. In certain embodiments, the one or more sensor elements may be configured to capture sensor data comprising one or more of object speed data, object position data, object weight data, object size data, and conveyor angle data. In certain embodiments, the controller may be configured to determine an inertial force associated with the object based at least in part on the sensor data. In certain embodiments, the controller may be further configured to compare the inertial force to a threshold inertial force; and, upon determining that the initial force is greater than the threshold inertial force, selectively operate the second roller.

In various embodiments, the plurality of rollers may include a second drive roller operably connected to the second roller, and wherein the second drive roller is communicably connected to the controller such that the controller is configured to cause the second roller to selectively rotate by selectively operating the second drive roller. In various embodiments, the second roller may be operably connected to an external motor assembly that is communicably connected to the controller such that the controller is configured to selectively rotate the second roller by selectively operating the external motor. In various embodiments, the conveyor assembly may be configured to execute the stopping operation by stopping a first rotation of the first drive roller and initiating a second rotation of the second roller in the second rotational direction at substantially the same time. In certain embodiments, the conveyor assembly may be further configured to execute the stopping operation by initiating a third rotation of the first drive roller in the first rotational direction to impart a balancing force on the conveyor surface that is at least substantially equal and opposite to the counterforce. In various embodiments, the conveyor assembly may be configured such that as the first drive roller is being operated to rotate in the first rotational direction, the second roller embodies a free-rotating idler roller such that the movement of the conveyor surface in the conveyance direction causes the second roller to rotate in the first rotational direction. In certain embodiments, the one or more controls signals may be generated by the controller comprises a second motor activation signal configured to initiate an operation of the second motor such that the second roller embodies a slave roller controlled by the operation of the second motor during at least a portion of the stopping operation.

In various embodiments, the first drive roller may comprise an internal brake assembly, wherein the controller is configured to control the internal brake assembly of the first drive roller; and executing the stopping operation may comprise activating the internal brake assembly defined by the first drive roller to at least substantially stop the first drive roller from rotating in the first rotational direction. In various embodiments, plurality of rollers may further comprise a first slave roller engaged with at least a portion of a conveyor belt defining the conveyor surface, the first slave roller being operably connected to the first drive roller such that rotation of the first drive roller in the first rotational direction results in a corresponding rotation of the first slave roller in the first rotational direction. In certain embodiments, the second roller may define a second slave roller operably connected to one of a second drive motor and an external motor assembly, the second slave roller being engaged with at least a second portion of the conveyor belt.

Various embodiments are directed to a method of operating a conveyor assembly, the method comprising operating a first drive roller to cause a movement of a conveyance surface in a conveyance direction, wherein the conveyor surface is configured to move in the conveyance direction in order to transport an object disposed thereon along a transportation path defined within a conveyor zone; initiating a stopping operation to stop the movement of the conveyor surface in the conveyance direction by causing a second roller engaged with the conveyor belt to rotate in a second rotational direction so as to at least partially counteract the inertial forces associated with the object; wherein the second roller is operated such that the object disposed on the conveyor surface are stopped at a stop position defined within the conveyor zone.

In various embodiments, the method may further comprise capturing sensor data associated with one or more of an operational configuration defined by the conveyor surface within the conveyor zone and the object disposed on the conveyor surface. In certain embodiments, the sensor data captured by the one or more sensor elements may comprise one or more of object speed data, object weight data, object size data, and conveyor angle data. Further, in various embodiments, the method may further comprise determining an inertial force associated with the object based at least in part on the sensor data. In certain embodiments, the method may further comprise comparing the inertial force associated with the object to a threshold inertial force; and upon determining that the initial force is greater than the threshold inertial force, selectively operating a secondary motor to cause the second roller to rotate in the second rotational direction opposing the movement of the conveyor surface to stop the movement of the conveyor surface such that the object disposed thereon is stopped within the conveyor zone. In various embodiments, the first drive roller may comprise an internal brake assembly, and wherein executing the stopping operation comprises activating the internal brake assembly defined by the first drive roller to at least substantially stop the first drive roller from rotating in the first rotational direction.

BRIEF DESCRIPTION OF THE DRAWINGS

Reference will now be made to the accompanying drawings, which are not necessarily drawn to scale, and wherein:

FIG. 9 is a flowchart diagram illustrating example operations in accordance with various embodiments of the present disclosure; and FIG. 10 is a flowchart diagram illustrating example operations in accordance with various embodiments of the present disclosure.

DETAILED DESCRIPTION

Figure 1:
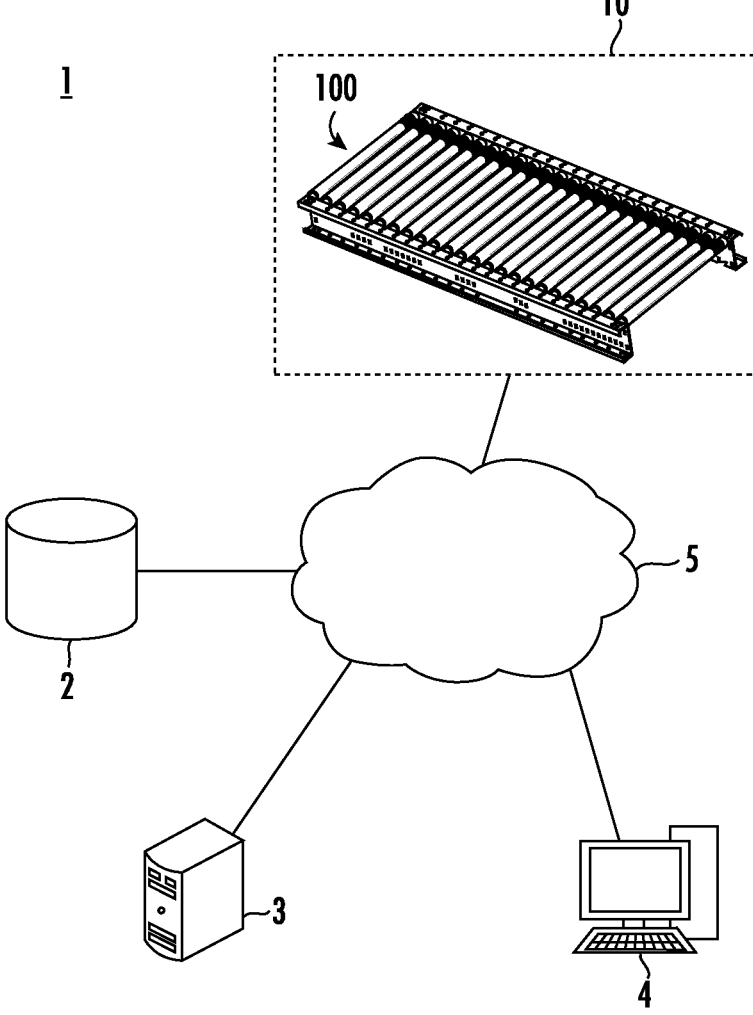
FIG. 1 illustrates an example of a system in accordance with various embodiments of the present disclosure.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

In various examples, a conveyor assembly may facilitate the transportation of an object along a transportation path through a sequence of conveyor zones that define regions of independent control of object transportation. For example, an exemplary conveyor assembly may embody a conveyor belt assembly in which each conveyor zone is defined by a zone length that extends along a conveyor surface configured to move in a conveyance direction to transport an object disposed thereon along the portion of a transportation path defined by the conveyor zone. As such, the transportation of the object travelling along the transportation path is driven by corresponding movements of the respective conveyor surfaces (e.g., a conveyor belt) defined within each of the conveyor zones in the conveyor assembly. In some example conveyor assemblies, one or more of the conveyor zones may be independently controlled to execute a stopping operation in order to stop the movement of the corresponding conveyor surface defined within the zone to halt the movement of the object as it is travelling through the conveyor zone. For example, various conveyor assemblies may utilize brake assemblies configured to be selectively activated in order to stop the movement of the conveyor surface upon which an object is disposed with that the object is brought to a complete stop at a position along the transportation path. As described herein, when various conveyor assemblies comprising independently controllable conveyor zones execute a stopping operation to stop the progress of an object being transported along the transportation path, an inertial force defined by the object may cause the object to continue to move along the transportation path (e.g., via an additional movement of the conveyor surface caused by the inertial force) such that the object is moved at least partially out of the conveyor zone. Such an exemplary circumstance wherein a conveyor assembly cannot account for an inertial force generated by an object upon initiation of a stopping operation, causing the object to undesirably progress along the transportation path into a downstream conveyor zone may result in various operational inefficiencies associated with the conveyor assembly, including inaccurate object tracking data, object mishandling failures resulting from unaccounted for objects being present within a downstream zone, product flow jams caused by one or more objects being simultaneously positioned in two consecutive conveyor zones, and/or the like.

In one or more aspects of the present disclosure, an exemplary conveyor assembly transporting an object along a transportation path comprises a plurality of rollers configured to facilitate transportation of the object disposed on a conveyor surface through a conveyor zone, wherein the plurality of rollers includes a first drive roller selectively operable to rotate in a first rotational direction to cause a movement of the conveyance surface in a conveyance direction to move the object along a transportation path defined within the conveyor zone; and a second roller configured to be selectively rotated in a second rotational direction opposite the first rotational direction in order to generate a counterforce that opposes the movement of the conveyor surface in the conveyance direction. As described herein, the conveyor assembly includes a controller configured to generate one or more control signals to control the first drive roller and a secondary motor operable to drive rotation of the second roller in the second rotational direction. The conveyor assembly is configured to execute a stopping operation by selectively causing the second roller to rotate in the second rotational direction to stop the movement of the conveyor surface such that the object disposed thereon is stopped at a stop position defined within the conveyor zone.

Referring now to FIG. 1, a schematic diagram depicting an example system 1 in accordance various embodiments of the present disclosure is provided. As depicted, the example system 1 includes a conveyor assembly 10 comprising one or more motorized conveyor rollers, one or more computing entities 3 (e.g., servers), one or more databases 2, one or more networks 5, one or more user computing entities 4, and/or the like. In various examples, the system 1 can operate to convey objects within a particular location or environment.

In various embodiments, the conveyor assembly 10 can be configured to transport objects within a particular location or environment utilizing one or more motorized conveyor rollers. In some embodiments, the conveyor assembly 10 includes one or more motorized conveyor rollers, the one or more computing entities 3, the one or more databases 2 and/or the one or more user computing entities 4 are in electronic communication with each other over the one or more networks 5 such that they can exchange data (e.g., receive and transmit data) with one another (e.g., periodically and/or in response to requests). Each of the components of the system 1 can be in communication with one another over the same or different wireless or wired networks 5 including, for example, a wired or wireless Personal Area Network (PAN), Local Area Network (LAN), Metropolitan Area Network (MAN), Wide Area Network (WAN), cellular network, and/or the like. While FIG. 1 illustrates certain system components as separate, standalone devices, the various embodiments are not limited to this particular architecture.

As depicted in FIG. 1, the example system 1 includes one or more computing entities 3. In general, the terms computing device, entity, device, system, and/or similar words used herein interchangeably can refer to, for example, one or more computers, computing devices, computing entities, desktop computers, mobile phones, tablets, phablets, notebooks, laptops, distributed systems, terminals, servers or server networks, blades, gateways, switches, processing devices, set-top boxes, relays, routers, network access points, base stations, the like, and/or any combination of devices adapted to perform the functions, operations, and/or processes described herein. Such functions, operations, and/or processes can include, for example, transmitting, receiving, operating on, processing, displaying, storing, determining, generating/creating, monitoring, evaluating, comparing, and/or similar terms used herein interchangeably. In one embodiment, these functions, operations, and/or processes can be performed on data, content, information, and/or similar terms used herein interchangeably.

In some examples, the computing entity 3 can also include one or more network and/or communications interfaces for communicating with various computing entities, such as by communicating data, content, information, and/or similar terms used herein interchangeably that can be transmitted, received, operated on, processed, displayed, stored, and/or the like.

In one embodiment, the computing entity 3 can further include or be in communication with non-volatile media (also referred to as non-volatile storage, memory, memory storage, memory circuitry and/or similar terms used herein interchangeably). In one embodiment, the non-volatile storage or memory can include one or more non-volatile storage or memory media as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media can store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably can refer to a structured collection of records or information/data that is stored in a computer-readable storage medium, such as via a relational database, hierarchical database, and/or network database.

In one embodiment, the computing entity 3 can further include or be in communication with volatile media (also referred to as volatile storage, memory, memory storage, memory circuitry and/or similar terms used herein interchangeably). In one embodiment, the volatile storage or memory can also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media can be used to store at least portions of the databases, database instances, database management system entities, data, applications, programs, program modules, scripts, source code, object code, byte code, compiled code, interpreted code, machine code, executable instructions, and/or the like being executed by, for example, the processing element. Thus, the databases, database instances, database management system entities, data, applications, programs, program modules, scripts, source code, object code, byte code, compiled code, interpreted code, machine code, executable instructions, and/or the like can be used to control certain aspects of the operation of the computing entity 3 with the assistance of the processing element and the operating system.

As indicated, in one embodiment, the computing entity 3 can also include one or more network and/or communications interfaces for communicating with various computing entities, such as by communicating data, content, information, and/or similar terms used herein interchangeably that can be transmitted, received, operated on, processed, displayed, stored, and/or the like. Such communication can be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, computing entity 3 can be configured to communicate via wireless external communication networks using any of a variety of protocols, such as embedded sim (eSIM), remote sim provisioning (RSP), general packet radio service (GPRS), Universal Mobile Telecommunications System (UMTS), Code Division Multiple Access 200 (CDMA200), CDMA200 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), IR protocols, NFC protocols, RFID protocols, IR protocols, ZigBee protocols, Z-Wave protocols, 6LoWPAN protocols, Wibree, Bluetooth protocols, wireless universal serial bus (USB) protocols, and/or any other wireless protocol. The computing entity 3 can use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the computing entity's 3 components can be located remotely from other computing entity 3 components, such as in a distributed system. Furthermore, one or more of the components can be aggregated and additional components performing functions described herein can be included in the computing entity 3. Thus, the computing entity 3 can be adapted to accommodate a variety of needs and circumstances, such as including various components described with regard to a mobile application executing on the user computing entity 4, including various input/output interfaces.

As depicted in FIG. 1, the system 1 includes a user computing entity 4. In various embodiments, the user computing entity 4 can be or include one or more mobile devices, wearable computing devices, and/or the like. An example user computing entity 4 can include an antenna, a transmitter (e.g., radio), a receiver (e.g., radio), and a processing element that provides signals to and receives signals from the transmitter and receiver, respectively. The signals provided to and received from the transmitter and the receiver, respectively, can include signaling information/data in accordance with an air interface standard of applicable wireless systems to communicate with various devices, such as a computing entity (e.g., central server), another user computing entity 4, and/or the like. In an example embodiment, the transmitter and/or receiver are configured to communicate via one or more SRC protocols. For example, the transmitter and/or receiver can be configured to transmit and/or receive information/data, transmissions, and/or the like of at least one of Bluetooth protocols, low energy Bluetooth protocols, NFC protocols, RFID protocols, IR protocols, Wi-Fi protocols, ZigBee protocols, Z-Wave protocols, 6LoWPAN protocols, and/or other short range communication protocol. In various embodiments, the antenna, transmitter, and receiver can be configured to communicate via one or more long range protocols, such as GPRS, UMTS, CDMA200, 1×RTT, WCDMA, GSM, EDGE, TD-SCDMA, LTE, E-UTRAN, EVDO, HSPA, HSDPA, Wi-Fi, Wi-Fi Direct, WiMAX, and/or the like. The user computing entity 4 can also include one or more network and/or communications interfaces for communicating with various computing entities, such as by communicating data, content, information, and/or similar terms used herein interchangeably that can be transmitted, received, operated on, processed, displayed, stored, and/or the like. In this regard, the user computing entity 4 can be capable of operating with one or more air interface standards, communication protocols, modulation types, and access types. More particularly, the user computing entity 4 can operate in accordance with any of a number of wireless communication standards and protocols. In a particular embodiment, the user computing entity 4 can operate in accordance with multiple wireless communication standards and protocols, such as GPRS, UMTS, CDMA200, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 4 can communicate with various other devices using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 4 can also download changes, add-ons, and updates, for instance, to its firmware, software (e.g., including executable instructions, applications, program modules), and operating system.

According to one embodiment, the user computing entity 4 can include location determining aspects, devices, modules, functionalities, and/or similar words used herein interchangeably to acquire location information/data regularly, continuously, or in response to certain triggers.

The user computing entity 4 can include a user interface device comprising one or more user input/output interfaces (e.g., a display and/or speaker/speaker driver coupled to a processing element and a touch interface, keyboard, mouse, and/or microphone coupled to a processing element). For example, the user interface can be configured to provide a mobile application, browser, interactive user interface, dashboard, webpage, and/or similar words used herein interchangeably executing on and/or accessible via the user computing entity 4 to cause display or audible presentation of information/data and for user interaction therewith via one or more user input interfaces. Moreover, the user interface can include or be in communication with any of a number of devices allowing the user computing entity 4 to receive information/data, such as a keypad (hard or soft), a touch display, voice/speech or motion interfaces, scanners, readers, or other input device. In embodiments including a keypad, the keypad can include (or cause display of) the conventional numeric (0-9) and related keys (#, *), and other keys used for operating the user computing entity 4 and can include a full set of alphabetic keys or set of keys that can be activated to provide a full set of alphanumeric keys. In addition to providing input, the user input interface can be used, for example, to activate or deactivate certain functions, such as screen savers and/or sleep modes. Through such inputs the user computing entity 4 can capture, collect, store information/data, user interaction/input, and/or the like.

The user computing entity 4 can also include volatile storage or memory and/or non-volatile storage or memory, which can be embedded and/or can be removable. For example, the non-volatile memory can be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory can be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, information/data, applications, programs, program modules, scripts, source code, object code, byte code, compiled code, interpreted code, machine code, executable instructions, and/or the like to implement the functions of the user computing entity 4.

As depicted in FIG. 1, any two or more of the illustrative components of the system 1 of FIG. 1 can be configured to communicate with one another via one or more networks 5. The networks 5 can include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 5 can have any suitable communication range associated therewith and can include, for example, global networks (e.g., the Internet), MANs, WANS, LANs, or PANs. In addition, the networks 5 can include any type of medium over which network traffic can be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

While FIG. 1 provides an example system 1, it is noted that the scope of the present disclosure is not limited to the example shown in FIG. 1. In some examples, the system 1 can include one or more additional and/or alternative elements, and/or can be different from that illustrated in FIG. 1.

Figure 2:
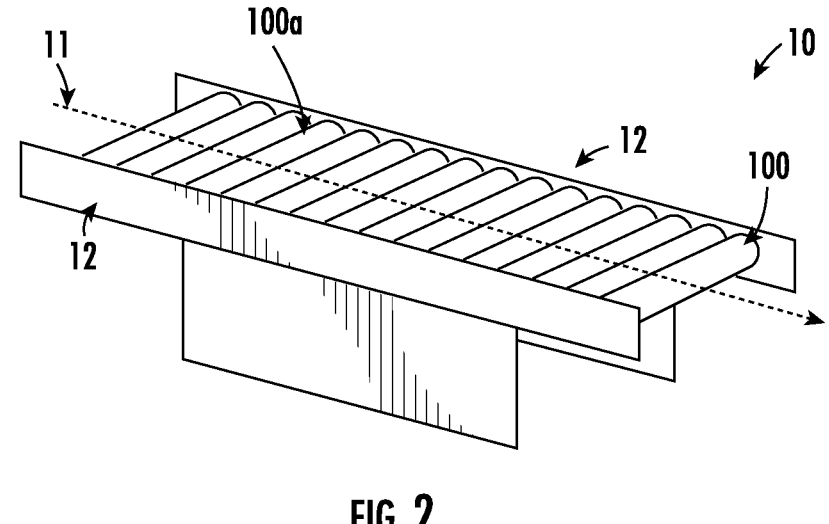
FIG. 2 illustrates a perspective view of an exemplary conveyor assembly according to various embodiments described herein.

FIG. 2 illustrates a perspective view of an example conveyor assembly 10 that is configured to transport an object along a transportation path 11. The transportation path 11 generally defines a path through which an object may be transported from an infeed point to a discharge point. That is, in various examples, the transportation path 11 may extend from an infeed point at one end to a discharge point at another end. The infeed point may refer to a location at which the conveyor assembly 10 receives objects for transportation. For example, an operator (e.g., human, manually operated, autonomous) may place an object on an upper surface of the conveyor assembly 10 at an infeed point to allow for the object to be transported via the conveyor assembly 10 to a discharge point through the transportation path 11. As another example, the infeed point may be positioned at and/or substantially near a discharge point of a preceding conveyor system, such that objects transported to the infeed point by the preceding conveyor system can be directly transported further to the discharge point of the conveyor assembly 10 through the transportation path 11.

In various examples, the transportation path 11 may be at least substantially linear; that is, the conveyor assembly 10 is configured to directly transport objects in a substantially straight path from an infeed point to a discharge point. In other various examples, the transportation path 11 may be non-linear and may include various turns, curves, diverting points, intersections, and/or the like. For instance, the conveyor assembly 10 may be configured to have a non-linear transportation path due to physical and/or environmental constraints, such as various obstacles and infrastructure within a warehouse. Similarly, the conveyor assembly 10 may be configured to have a non-linear transportation path such that objects may be transported near and past various environmental points, for example, where operator stations may be positioned to perform various processing tasks on the transported objects.

In various examples, the transportation path 11 may have verticality, and the conveyor assembly 10 is configured to transport an object through different elevations. Thus, in addition or alternative to horizontal variations (e.g., in a x-y plane), the transportation path 11 may include vertical variations (e.g., in a z plane) and/or other angled portions (e.g., relative to the horizontal plane) defining conveyor height variations.

In some example instances, the conveyor assembly 10 is configured to be capable of reversing the transportation path 11 along at least a portion of a conveying surface defined by the assembly 10. In doing so, the conveyor assembly 10 may then transport objects from the previous discharge point to the previous infeed point. Similarly, a conveyor assembly 10 having various intersections and/or diverting points may include multiple transportation paths 11 that extend through different segments of the conveyor assembly 10 connected at said intersections and/or diverting points. In various example embodiments, the conveyor assembly 10 is configured to transport different objects along different transportation paths 11 through various intersections and/or diverting points, such as for sorting tasks. Thus, while FIG. 2 illustrates one transportation path 11 for the conveyor assembly 10, it will be understood that a conveyor assembly 10 may be configured for any number of transportation paths 11 that may be linear and/or non-linear.

As illustrated, the conveyor assembly 10 comprises a plurality of rollers 100 positioned along the transportation path 11. In some examples, the conveyor assembly 10 may define a belt conveyor having a conveyor belt (not shown) engaged with at least a portion of the plurality of rotatable rollers defined by the conveyor assembly that may be individually and/or collectively controlled to selectively drive movement of the conveyor belt such that a conveyor surface defined by the conveyor belt, upon which one or more objects may be disposed, moves in a conveyance direction to facilitate a transportation of the one or more objects disposed thereon along the transportation path 11 (e.g., the direction of travel of the conveyor surface). In various embodiments wherein an exemplary conveyor assembly 10 includes a conveyor belt looped around at least a portion of the plurality of roller 100a, an exemplary conveyor surface may be defined an outward-facing surface of the conveyor belt that is configured to interface and translate objects disposed thereon using a coating or material configured with a high friction coefficient. Further, in various embodiments, the conveyor belt may define an inward-facing surface configured to interface with at least a portion of the plurality of rollers 100 defined by the conveyor assembly 10 in order to transmit a force to the conveyor belt that causes the conveyor belt to move in a conveyance direction defined by the direction of rotation of at least one of the plurality of rollers 100.

As described herein, in various embodiments, an exemplary roller 100a of the plurality of rollers 100 may be substantially cylindrically-shaped, and a roller 100a may include a central rotational axis, a length along said axis, and a radius from the central rotational axis. At least a portion of an outer cylindrical surface of a roller 100a is configured to interface with a portion of the inward-facing surface of the conveyor belt (not shown) disposed tangentially above and/or below the roller 100a. In such an exemplary configuration, the physical engagement of the roller 100a with the conveyor belt surface may cause a rotation of the roller 100a to impart one or more forces on the conveyor belt such that the rotation of the roller 100a may facilitate a linear movement of the at the conveyor belt, such as, for example, a movement of the conveyor surface defined by the conveyor belt in the conveyance direction).

Specifically, the plurality of rollers 100 of the conveyor assembly 10 are positioned along the transportation path 11 such that the central rotational axis of each roller 100a is at least substantially perpendicular to the transportation path. Understood otherwise, the transportation path 11 of a conveyor assembly 10 may be defined as a path (e.g., linear, non-linear) that is at least substantially perpendicular to the central rotational axes of the plurality of rollers 100 of the conveyor assembly 10.

As illustrated, the plurality of rollers 100 of the conveyor assembly 10 may be positioned between at least two sidewalls 12 that generally define a roller housing. Each roller 100 may be secured a sidewall 12 at each respective end such that translational movement of each roller 100a in significantly restricted. Thus, each roller 100a may be limited due only rotational movement about respective central rotational axes, as each roller 100a is secured to and between the at least two sidewalls 12. A roller 100a may be fixedly secured between the at least two sidewalls 12 at either end of its central rotational axis. In some examples, a roller 100a comprises an axle, rod, and/or the like defining its central rotational axis, and said axle, rod, and/or the like is secured to the at least two sidewalls 12. In various embodiments, the at least two sidewalls 12 and the lengths of the plurality of rollers 100 (e.g., that span between the at least two sidewalls 12) are configured based at least in part on a width of the objects to be transported by the conveyor assembly 10. For instance, in an exemplary circumstance wherein the conveyor assembly 10 is to be used for transporting objects limited to a maximum width and/or dimension, the at least two sidewalls 12 and the lengths of each of the plurality of rollers 100 may be at least greater than said maximum width and/or dimension. With the plurality of rollers 100 being positioned between the sidewalls 12, it may be appreciated that the sidewalls 12 extend at least substantially parallel with the transportation path 11.

Figure 3:
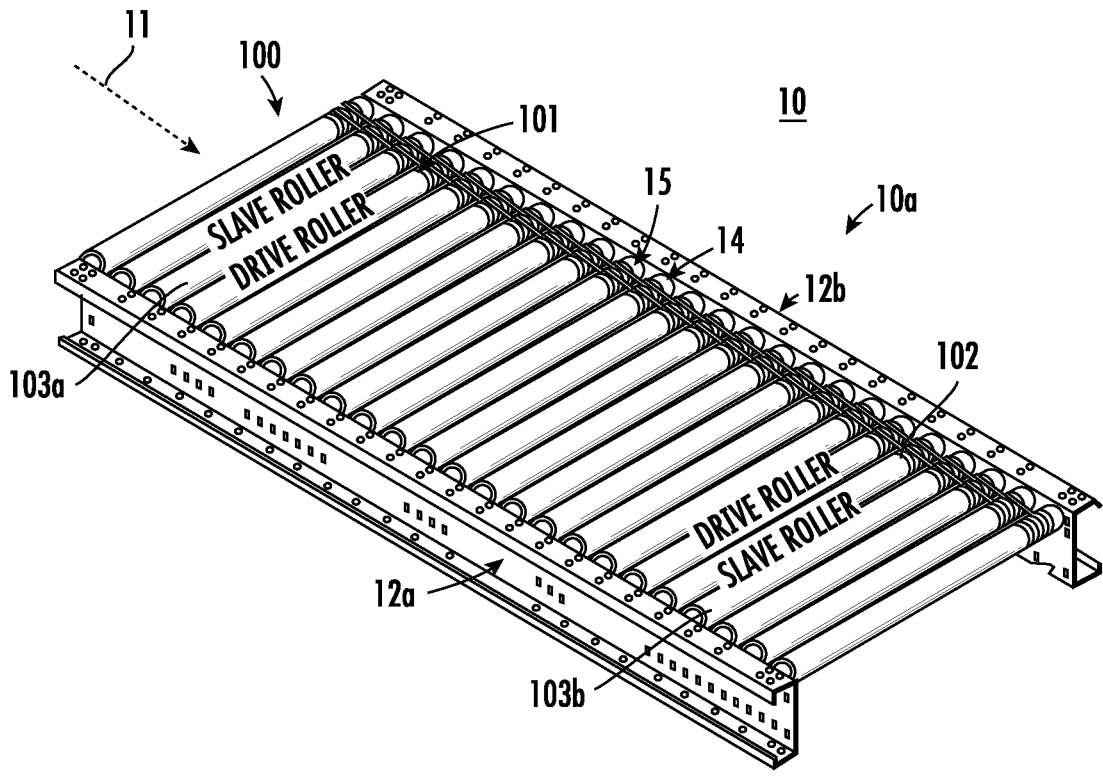
FIG. 3 a perspective view of an exemplary conveyor assembly according to various embodiments described herein.

In various embodiments, an exemplary conveyor assembly 10 defining a belt conveyor assembly may utilize a plurality of rollers to operably control the movement of the conveyor belt (not shown) in a conveyance direction defining the transportation path 11. As an illustrative example, FIG. 3 illustrates a perspective view of an example conveyor assembly with a plurality of rollers including both motorized drive rollers and non-motorized idler rollers in accordance with various embodiments of the present disclosure. In various embodiments, the movement of the conveyor belt of an exemplary conveyor assembly 10 may be driven by a plurality of rollers 100 comprising at least one drive roller (e.g., a motor driven roller (MDR)) and at least one idler roller operatively engaged with the at least one drive roller, such that the at least one idler roller embodies a slave roller driven by the at least one drive roller operatively connected thereto. In various embodiments, one or more of the idler rollers operatively connected to a drive roller of the plurality 100 may be being positioned to contact a portion of the conveyor belt surface defined by the conveyor belt.

For example, as illustrated, an exemplary conveyor assembly 10 may include a first drive roller 101 operatively connected to a first idler roller 103a such that the first drive roller 101 may be operated in order to cause the first idler roller 103a to rotate in a corresponding direction (e.g., a first rotational direction). In some embodiments, a conveyor zone within an exemplary conveyor apparatus 10 may be defined by a portion of the conveyor assembly 10 having a plurality of rollers 100 with at least one drive roller and at least one idler roller (e.g., a slave roller, a free-rotating idler roller, and/or the like) configured to rotate in one or more rotational directions based directly and/or indirectly on the rotation of the at least one drive roller in order to control the movement of a conveyor belt engaged therewith.

In various embodiments, the exemplary conveyor assembly 10 may include a conveyor belt (not shown) and a plurality of rollers 100 that collectively define a conveyor zone configured for transporting one or more objects disposed on the conveyor belt along a transportation path 11 defined by the conveyance direction of the conveyor belt. As depicted in FIG. 3, the plurality of rollers 100 may comprise at least one drive roller embodied by a motorized conveyor roller (e.g., a first drive roller 101, a second drive roller 102) and at least one idler roller embodied by a non-motorized conveyor roller (e.g., a first idler roller 103a, a second idler roller 103b). In the embodiment depicted in FIG. 3, the example conveyor assembly 10 further comprises at least a first conveyor sidewall 12a and a second conveyor sidewall 12b. As depicted in FIG. 3, each of the plurality of rollers 100 (e.g., first drive roller 101, first idler roller 103a, second idler roller 103b, and second drive roller 102) may be mechanically/operatively coupled to the first and second conveyor sidewalls 12a, 12b. In some embodiments, the first conveyor sidewall 12a and a second conveyor sidewall 12b may include one or more sets of apertures configured to receive the plurality of rollers 100.

In some embodiments, as depicted in FIG. 3, an exemplary roller of the plurality of rollers 100 may be one of a drive motor and an idler roller. For example, an exemplary drive roller of positioned within the conveyor assembly 10 may be a motorized conveyor roller, such as, for example, a motor driven roller (MDR), as described herein. In various embodiments, a drive roller 101 may be selectively rotated via a motor-driven operation. In various embodiments, a drive roller 101 may be operatively connected to an idler roller of the plurality 100. For example, in various embodiments, a drive roller 101 may be operatively connected to an idler roller such that the idler roller embodies a slave roller configured to rotate based on the driving rotation of the drive roller 101 operatively connected thereto. For example, as illustrated in FIG. 3, idler rollers 103a, 103b embody first and second slave rollers configured to be driven by the rotations of the first and second drive rollers 101, 102, respectively, operatively connected thereto.

In various embodiments, an exemplary drive roller 101 within the plurality of roller 100 of a conveyor assembly 10 may be configured to drive at least one idler roller (e.g., a first slave roller 103a) operatively connected thereto via one or more drive bands 14 engaged with both the drive roller 101 and the idler roller. In various embodiments, a drive band 14 may comprise an O-drive band configured to facilitate an operative engagement between each drive roller 101, 102 and a respective one or more idler rollers to enable the idler rollers to be driven by a corresponding motor-driven operation (e.g., rotation) of the respective drive roller 101, 102 operatively connected thereto. As depicted in FIG. 3, in various embodiments, one or more drive rollers (e.g., a first drive roller 101) and at least one idler roller (e.g., a first slave roller 103a) may be connected to each other through a series of drive bands 14 in order to operatively connect the idler roller to the corresponding drive roller associated therewith. As further depicted, in various embodiments, drive bands 14 may be reeved around a tracking ring 15 provided on a drive roller and/or an idler roller. For example, a tracking ring 15 may operate to ensure that a drive band 14 engaged therewith does not slip out of the roller defining the tracking ring 15 (e.g., the drive roller 101, 102 and/or the idler roller 103a, 103b) when the roller is operated (e.g., rotated) at full speed. Further, a drive band 14 may be connected to idler pulleys provided on/attached to either the first or the second conveyor sidewall 12a, 12b of the conveyor assembly 10 to maintain a target tension between the drive band 14 and one or more of the plurality of rollers 100 (e.g., a drive roller and/or an idler roller) with which the band 14 is engaged.

In various embodiments, one or more motors of a conveyor assembly 10 (e.g., a first driver motor 101, a second drive motor 102, an external motor operatively connected to one or more slave rollers of the plurality 100) may be unidirectional to facilitate a rotation of the rollers 100 in one of a clockwise or a counter-clockwise rotational direction. For example, as illustrated, in various embodiments, an exemplary conveyor assembly 10 may include a first motor embodying a first drive roller 101 operatively connected to a first slave roller 103a and configured to for rotation in a first rotational direction, and a second motor embodying a second drive roller 102 operatively connected to a second slave roller 103b and configured to be selectively operated (e.g., during a stopping operation) for rotation in a second rotational direction that is opposite the first rotational direction defined by the first drive roller 101. Further still, in various embodiments, the conveyor assembly 10 may include one or more motors configured for bidirectional operation to facilitate selective operation to drive one or more of the plurality of rollers 100 in wither a first rotational direction or an opposing second rotational direction. Using bidirectional motors, the rotation of a roller 100a operatively connected thereto may be selectively reversed (e.g., from clockwise to counter-clockwise, and vice versa), such as, for example, in order to selectively switch between an operating condition and a stopping condition, as described herein.

While FIG. 3 depicts an example conveyor apparatus 10a of an exemplary conveyor assembly 10 according to various embodiments described herein, it is noted that the scope of the present disclosure is not limited to the example shown in FIG. 3. An example conveyor apparatus 10a of an exemplary conveyor assembly 10 in accordance with the present disclosure may comprise one or more additional and/or alternative elements, and/or may be different from that illustrated in FIG. 3.

In various embodiments, an exemplary conveyor assembly 10 embodying a belt conveyor assembly may define one or more conveyor zones along the transportation path 11, each conveyor zone including an independently operably conveyor belt that is selectively moved in a corresponding conveyance direction based at least in part on a movement (e.g., a rotation and/or any other driving movement) of one or more of a corresponding plurality of rollers engaged with the respective conveyor belt. As described herein, a conveyor zone of the conveyor assembly 10 may refer to a region or length of the transportation path 11 (e.g., along a conveyor apparatus defined by a conveyor belt and a plurality of rollers engaged therewith) within which operation of the conveyor assembly 10 can be independently controlled. For example, in various embodiments, at least a portion of the rollers defining an exemplary conveyor zone of the conveyor assembly 10 may be selectively operated to drive the corresponding conveyor belt in a conveyance direction such that one or more objects disposed upon a conveyance surface defined by the conveyor belt are transported along a portion of the transportation path 11 defined by the conveyor zone.

Figure 4:
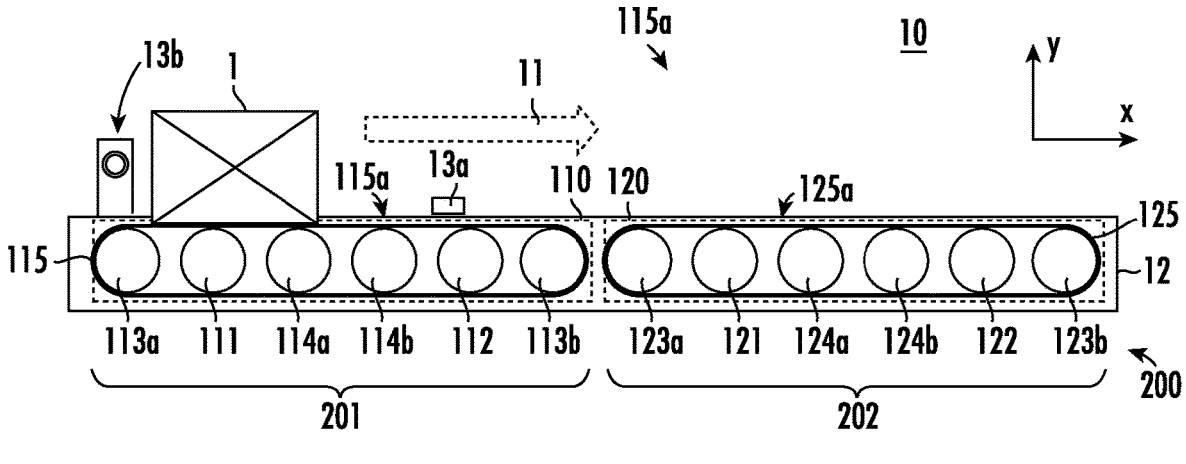
FIG. 4 schematically illustrates a side cross-sectional view of an exemplary conveyor assembly according to various embodiments described herein.

FIG. 4 illustrates a side cross-sectional view of an exemplary conveyor assembly 10 having a plurality of conveyor zones 200 defined sequentially (e.g., serially and/or consecutively) along the transportation path 11. As illustrated, the conveyor assembly 10 comprises a first conveyor belt 115 configured to be driven in a conveyance direction by the rotation of a first set of rollers 110 engaged therewith and a second conveyor belt 125 configured to be driven in the conveyance direction by the rotation of a second set of rollers 120 engaged therewith. The conveyor assembly 10 may be configured such that, based at least in part on the first set of rollers 110 and the second set of rollers 120 being independently operable, the first conveyor belt 115 may move independently of the second conveyor belt 125 to define a first conveyor zone 201 and a second conveyor zone, respectively.

As shown in the cross-sectional view of FIG. 4, the exemplary conveyor assembly 10 comprises a first set of rollers 110 operably engaged with a first conveyor belt 115 and configured to be selectively operated such that one or more rollers thereof (e.g., a drive roller) is rotated in a first rotational direction in order to drive a corresponding linear movement of the first conveyor belt 115 in the conveyance direction. As illustrated, the conveyance direction defined by the first conveyor belt 115 of the first conveyor zone 201 is defined by the linear direction in which the first conveyance surface 115a of the first conveyor belt 115 is moved in order to transport the object 1 disposed thereon along the transportation path 11. As an illustrative example, the conveyance direction defined by the first conveyor belt 115 is at least substantially parallel to the positive x-direction, as defined in the exemplary orientation illustrated in FIG. 4. As further illustrated, the exemplary conveyor assembly 10 further comprises a second set of rollers 120 operably engaged with a second conveyor belt 125 and configured to be selectively operated such that one or more rollers thereof (e.g., a drive roller) is rotated in the first rotational direction in order to drive a corresponding linear movement of the second conveyor belt 125 in a conveyance direction. As illustrated, the conveyance direction defined by the second conveyor belt 125 of the second conveyor zone 202 is defined by the linear direction in which the second conveyance surface 125a of the second conveyor belt 125 is moved in order to transport an object 1 disposed thereon along the transportation path 11. As an illustrative example, the conveyance direction defined by the second conveyor belt 125 is at least substantially parallel to the positive x-direction, as defined in the exemplary orientation illustrated in FIG. 4.

As described herein, the first set of rollers 110 may be operated to rotate at a time and/or at a rotational speed that is different than the time and/or the rotational speed defining the operation of one or more other sets of rollers (e.g., a second set of rollers 120) defining another conveyor zone (e.g., a second conveyor zone 202) such that the first conveyor belt 115 driven by the first set of rollers 110 is moved at a time and/or at a linear speed (e.g., corresponding to the rotational speed of the first set of rollers 110) that is different than the time and/or the linear speed defining the movement of one or more other conveyor belts (e.g., a second conveyor belt 125) defining another conveyor zone of the conveyor assembly 10. In various embodiments, respective sets of rollers (e.g., a first set of rollers 110, a second set of rollers 120) within different conveyor zones of the conveyor assembly 10 may be independently, uniquely, and/or variably operated in order to drive the respective conveyor belts to accomplish various transportation criteria, directives, objectives, and/or the like (e.g., creating a buffer distance between a line of objects 1, accumulating a number of objects at a certain location for a processing task, and/or the like). Accordingly, as described herein, each conveyor zone 200 may be associated with at least one motor (e.g., a motor-driven drive roller, an external motor, and/or the like), such that each conveyor zone 200 can be controlled at one or more particular instances and/or at a linear speed (e.g., a corresponding rotational speed) by the at least one corresponding motor.

In various embodiments, as illustrated in FIG. 4, a conveyor zone 200 may be defined along the transportation path 11 to include a plurality of rollers 100. As described, in various embodiments, each conveyor zone 200 defined by the conveyor assembly 10 may include a set (e.g., a plurality) of rollers comprising at least one drive roller, and at least one idler roller. In various embodiments, each conveyor zone 200 may include at least one drive roller that is operated (e.g., rotated) by a motor associated therewith. An exemplary drive roller may be operatively connected (e.g., via banding, ties, connections, and/or the like) to an idler roller of the of the plurality 100 positioned within the conveyor zone such that the idler roller functions as a slave roller configured to be driven by the rotation of the drive roller in order to cause the conveyor belt engaged with the idler roller to move in a conveyance direction.

In various embodiments, an exemplary conveyor zone of the exemplary conveyor assembly 10 may include a first drive roller configured for selective rotation in a first rotational direction such that, based on the engagement of the first drive roller and/or a slave roller operatively connected thereto with the corresponding conveyor belt (e.g., at a portion of the inward-facing conveyor belt surface engaged with the outer surface of the first drive roller), a linear force is imparted on the conveyor belt in a direction corresponding to the conveyance direction. That is, the first drive roller of each conveyor zone is configured to rotate in the first rotational direction to directly and/or indirectly (e.g., via a slave roller) drive the movement of the corresponding conveyor belt engaged with the plurality of rollers 100 in a respective conveyance direction. For example, in various embodiments, one or more of the drive rollers of an exemplary conveyor zone, such as, for example, the first drive roller 121 and/or the second drive roller of the second conveyor zone 202, may be directly engaged with the conveyor belt 125 such that rotating a rotation of the drive roller 121, 122 in either a first or a second rotational direction, as described herein, directly imparts a linear force on the conveyor surface 125a at a respective point of contact with the conveyor belt 125.

In various embodiments, an exemplary idler roller arranged within a conveyor zone may be configured to operate as either a free-rotating idler roller or a slave roller at a particular instance. For example, an idler roller may be operably connected to a drive roller and used as a slave roller at a particular instance in which the drive roller is being operated to drive a corresponding rotation in a rotational direction. Further, an idler roller being used as a free-rotating idler roller at a particular instance may be positioned within a conveyor zone and physically engaged with a portion of the conveyor belt surface such that, upon a movement of the conveyor belt, the free-rotating idler roller may exhibit an at least substantially simultaneous operation (e.g., a respective rotation of each of the idler rollers of the conveyor zone at substantially the same time) defined by a common rotational speed. In various embodiments, the rotation of each of a set of free-rotating idler rollers in a plurality of rollers may at least partially correspond to the rotation of a drive roller positioned within the conveyor zone configured for driving the movement of the conveyor belt engaged therewith. In various embodiments, an exemplary idler roller of an exemplary conveyor assembly 10 may be selectively used as a free-rotating idler roller during a first instance and selectively used as a slave roller in a second instance. For example, an exemplary idler roller (e.g., idler roller 113b) operably connected to a second drive roller 112 within a conveyor zone 201 may be used as a free-rotating idler roller during a first instance in which the conveyor zone 201 is being operated according to an operating condition to move the conveyor surface 115a in the conveyance direction. In such an exemplary circumstance in which the conveyor zone 201 defines an operating condition, the second drive roller 112 may similarly function as a free-rotating roller configured to rotate with the movement of the conveyor surface 115a. Further, the exemplary idler roller (e.g., idler roller 113b) may be selectively used as a slave roller during a second instance in which the conveyor zone 201 is being operated according to a stopping condition. In such an exemplary circumstance in which the conveyor zone 201 is executing a stopping operating to stop the movement of the conveyor surface 115a (e.g., the conveyor belt 115) in the conveyance direction, the second drive roller 112 may be selectively operated to drive a corresponding rotation of the idler roller operatively connected such that the idler roller embodies a slave roller.

As described herein, the at least one drive roller controlling operation of an exemplary conveyor zone may be selectively operated and/or controlled by one or more components of the conveyor assembly 10 that are in electronic communication with the motor of the drive motor (e.g., a controller). For example, in the exemplary embodiment illustrated in FIG. 4, each of the illustrated conveyor zones 200 includes a first drive roller configured to be selectively operated to cause the conveyor belt engaged therewith to move in a respective conveyance direction. For example, the first drive roller may be selectively rotated in a first rotational direction in order to cause a slave roller operatively connected thereto and engaged with a surface of the conveyor belt to be similarly rotated in the first rotational direction. Based on the physical engagement of the slave roller with the conveyor belt, the rotation of the slave roller driven by the first drive roller results in the slave roller imparting a linear force on the conveyor belt that causes the conveyor belt to move in the conveyance direction. In various embodiments, the plurality of rollers within a conveyor zone may collectively impart a collective force (e.g., a driving force, a stopping force) on the conveyor belt engaged therewith that is defined at least in part by the respective forces imparted on the conveyor belt by each of the slave rollers engaged therewith. Further, in various embodiments wherein one or more of the drive rollers is engaged with the conveyor belt, the collective force imparted on the conveyor belt from the plurality of rollers may be further defined by the force imparted on the conveyor belt by the one or more drive roller engaged therewith.

As an illustrative example, the first conveyor zone 201 of the exemplary conveyor assembly 10 illustrated in FIG. 4 is defined by a first set of rollers 110, including a first drive roller 111 and plurality of idler rollers, including a first slave roller 113*a*, a second slave roller 113*b*, a first free-rotating idler roller 114*a* and a second free-rotating idler roller 114*b*. In various embodiments, at least the first and second slave rollers 113*a*, 113*b* of the first set of rollers 110 within the conveyor zone 201 are physically engaged with the first conveyor belt 115 (e.g., at the inward-facing surface of the first conveyor belt 115). In such an exemplary configuration, the first slave roller 113*a* may be operatively connected to the first drive roller 111 such that the rotation of the first slave roller 113*a* is driven by operation of the first drive roller 111. The first drive roller 111 of the first conveyor zone 201 may be operated to rotate in a first rotational direction (e.g., in a clockwise direction as defined in the exemplary orientation illustrated in FIG. 4) so as to drive a corresponding rotation of the first slave roller 113*a* operatively connected thereto in an at least substantially similar direction. As described above, the physical contact between the slave rollers (e.g., the first and second slave rollers 113*a*, 113*b*) of the first set of rollers 110 and the inward-facing surface of the first conveyor belt 115 may be defined by a non-slip frictional engagement such that, as the first drive roller 111 causes the first slave roller 113*a* to rotate in the first rotational direction, the first slave roller 113*a* imparts a linear force on the first conveyor belt 115 that causes the first conveyor surface 115*a* to move in the conveyance direction (e.g., in the positive x-direction, as defined in the exemplary orientation illustrated in FIG. 4). For example, a movement of the first conveyor belt 115 in a corresponding conveyance direction may be defined by a movement that causes the object 1 disposed on the first conveyor surface 115*a* to be moved along the transportation path 11.

In particular, FIG. 4 illustrates an object 1 that may be transported along the transportation path 11 through the rotation of a plurality of rollers 100. As illustrated, the object 1 is disposed upon a first conveyor surface 115*a* defined by the first conveyor belt 115 of the first conveyor zone 201 such that, upon at least a portion of the first set of rollers 110 being operated to drive the first conveyor belt 115 in a conveyance direction, the object 1 may be transported through the first conveyor zone 201 and along the corresponding portion of the transportation path 11.

As further illustrated in FIG. 4, a second conveyor zone 202 of the exemplary conveyor assembly 10 may positioned at least substantially immediately downstream from the first conveyor zone 201, as defined along the transportation path 11. For example, the second conveyor zone 202 may include a second conveyor belt 125 that is independently operable from the first conveyor belt 115 and configured to receive an object 1 from the first conveyor zone 201 (e.g., on a second conveyor surface 125*a* thereof) upon the object 1 being transported, dispensed, and/or otherwise moved off of the first conveyor belt 114 of the first conveyor zone 201.

As illustrated, the second conveyor zone 202 is defined in part by a second set of rollers 120, including a first drive roller 121, a second drive roller 122, and plurality of idler rollers, including a first free-rotating idler roller 124*a*, a second free-rotating idler roller 124*b*, a third free-rotating idler roller 124*c*, and a fourth free-rotating idler roller 124*d*. In various embodiments, at least the first and second drive rollers 121, 122 of the second set of rollers 120 within the conveyor zone 202 are physically engaged with the second conveyor belt 125 (e.g., at the inward-facing surface of the second conveyor belt 125). In such an exemplary configuration, the first drive roller 121 of the second conveyor zone 202 may be operated to rotate in the first rotational direction (e.g., in a clockwise direction as defined in the exemplary orientation illustrated in FIG. 4). As described above, in such an exemplary configuration wherein the first and/or second drive roller 121, 122 of the conveyor zone 202 are directly engaged with the conveyor belt 125, the physical contact between the drive rollers (e.g., the first and second drive rollers 121, 122) of the second set of rollers 120 and the inward-facing surface of the second conveyor belt 125 may be defined by a non-slip frictional engagement such that, as the first drive roller 121 rotates in the first rotational direction, the first drive roller 121 imparts a linear force on the second conveyor belt 125 that causes the second conveyor surface 125*a* to move in the conveyance direction (e.g., in the positive x-direction, as defined in the exemplary orientation illustrated in FIG. 4).

In various embodiments, as further illustrated in FIG. 4, one or more conveyor zones defined by an exemplary conveyor assembly 10 may include a set of rollers comprising both a first drive roller and a second drive roller, each being engaged with a respective portion of the conveyor belt defining the conveyor zone and independently operable relative to one another. For example, in various embodiments, as described herein, the first drive roller within a conveyor zone may be operably connected to at least one idler roller (e.g., a slave roller) within the conveyor zone and operable for selective rotation in a first rotational direction to drive (e.g., via the slave roller) a corresponding movement of the conveyor belt in the conveyance direction. In such an exemplary configuration, the second drive roller defined by the conveyor zone may be operable for selective rotation in a second rotational direction defined by the opposite rotational direction of the first rotational direction in which the first drive roller is rotated. In various embodiments, the second drive roller may be operably connected to a second idler roller (e.g., a slave roller) within the conveyor zone that is physically engaged with the conveyor belt of the conveyor zone. As described in further detail herein, the second drive roller is operable to control the rotation of the idler roller operably connected thereto such that the second drive roller may be selectively operated to drive a corresponding rotation of the idler roller in the second rotational direction. The physical contact between the conveyor belt and the idler roller operatively connected to the second drive roller may cause a linear force to be imparted on the conveyor belt that opposes the movement of the conveyor belt in the conveyance direction. For example, in various embodiments wherein the movement of the conveyor belt (e.g., in the conveyance direction) within an exemplary conveyor zone is stopped by stopping the operation of the first drive roller (e.g., and thus, stopping the rotations of the slave roller operatively connected thereto), the second drive roller may be operated during at least a portion of the stopping operation so as to at least partially counteract one or more inertial forces defined by the conveyor belt and/or the object disposed thereon as the conveyor belt is being stopped.

In various embodiments, one or more of the drive rollers may include a brake assembly configured to be selectively activated in order to stop the rotation of a drive roller. For example, as illustrated, the first drive roller 111 may comprise a brake assembly that may be utilized to stop the rotation of the first drive roller 111 in order to initiate a stopping operation wherein the conveyor belt 115 engaged with the first set of rollers 110 is stopped. Further, in various embodiments, one or more of the drive rollers may be configured to facilitate a stopping operation of the conveyor belt 115 by selectively rotating in a second rotational direction that opposes the movement of the conveyor belt 115 in the conveyance direction. For example, as illustrated, the second drive roller 112 may be selectively rotated in the second rotational direction so as to directly and/or indirectly cause one or more forces opposing the motion of the conveyor belt 115 to be imparted on the conveyor belt, thereby at least partially contributing to the stopping of the conveyor belt 115.

In various embodiments, an exemplary conveyor zone (e.g., first conveyor zone 201, second conveyor zone 202) may include a second drive roller that may be selectively operated in order to at least partially affect the movement of the conveyor belt defined within the conveyor zone. For example, as illustrated in FIG. 4, the first set of rollers 110 within the first conveyor zone 201 may include a second drive roller 112 that is operatively connected to a second slave roller 113b such that the operation of the second drive roller 112 may drive the rotation of the second slave roller 113b. In various embodiments, the second drive roller 112 of the first conveyor zone 201 may be configured for selective use as a free-rotating roller when the second drive roller 112 is nonoperational. Further, the second drive roller 112 may be selectively operated via a motor-driven rotation in a second rotational direction that is opposite the first rotational direction defined by the first drive roller 111 the first conveyor zone 201 (e.g., in a counter-clockwise direction as defined in the exemplary orientation illustrated in FIG. 4). In such an exemplary configuration, a rotation of the second drive roller 112 in the second rotational direction may drive a corresponding rotation of the second slave roller 113b operatively connected thereto in an at least substantially similar direction. As described above, the second slave roller 113b may be in physical contact with the inward-facing surface of the first conveyor belt 115 such that, as the second drive roller 112 causes the second slave roller 113b to rotate in the second rotational direction, the second slave roller 113b imparts a linear force on the first conveyor belt 115 that at least substantially opposes the movement of the conveyor belt 115 in the conveyance direction (e.g., in the negative x-direction, as defined in the exemplary orientation illustrated in FIG. 4). As described herein, the conveyor assembly 10 may be configured such that the second drive roller 112 may be selectively operated in order to impart a force on the conveyor belt 115 that opposes the movement of the conveyor belt 115 and/or the inertial force(s) defined by an object 1 disposed on the conveyor surface 115a to, for example, facilitate a stopping of the conveyor belt 115.

It should be understood that, while FIG. 4 illustrates a transportation path 11 that is parallel with the cross-sectional view, various example conveyor assemblies 10 may be configured with transportation paths 11 that are non-linear and that may include any number of turns, curves, diverting points, intersections, and/or the like. By extension, the plurality of rollers 100 of such conveyor assemblies 10 may not necessarily be oriented to be parallel with each and every other roller of the plurality 100; that is, the plurality of rollers 100 may be positioned at varying angles (although not explicitly illustrated) relative to each other to facilitate any transportation path 11 (e.g., a nonlinear transportation direction). Further, as described herein, in various embodiments, an exemplary conveyor zone of a conveyor assembly 10 may define an incline zone and/or a decline zone relative to various other conveyor zones within the conveyor assembly 10. For example, the opposing conveyor sidewalls 12 may be disposed at an angle relative to a horizontal plane such that the plurality of rollers disposed between the sidewalls 12 that define the incline/decline zone are provided at varying heights relative to one another and the conveyor belt engaged with the inclined/declined plurality of rollers defines an inclined/declined conveyor surface for transporting an object through the incline/decline zone.

In various embodiments, an exemplary conveyor assembly 10 may comprise one or more sensor devices configured to capture conveyor data associated with the physical arrangement (e.g., the angular configuration) of one or more conveyor zones within the conveyor assembly, and/or object data associated with one or more objects being transported along a transportation path, such as, for example, on a conveyor surface defined by a conveyor belt within the conveyor zone.

For example, as illustrated in FIG. 4, an exemplary conveyor assembly 10 may include at least one sensor device 13a configured to capture object data associated with one or more objects 1 positioned relative to a conveyor zone 201, such as, for example, at an infeed position of the conveyor zone 201 on a first conveyor surface 115a defined by a first conveyor belt 115 of the first conveyor zone 201. Further, in various embodiments, the exemplary conveyor assembly 10 may include at least one sensor device 13b configured to capture conveyor data associated with the first conveyor zone 201, such as, for example, the angular configuration of the conveyor zone 201 defined by the conveyor angle of the conveyor surface 115a.

In various embodiments, an exemplary sensor device associated with a conveyor zone (e.g., a first conveyor zone) may include a sensor element configured to capture conveyor data associated with an operational configuration defined by the conveyor surface within the conveyor zone. For example, in various embodiments, as illustrated, an exemplary conveyor assembly 10 may comprise a first sensor element 13a configured to capture conveyor data including conveyor angle data defined at least in part by the angular configuration of the conveyor surface 115$a$ within the conveyor zone 201. In various embodiments, a first sensor element 13$a$ may be configured to measure the angle of the conveyor surface 115$a$ upon which an object 1 being transported through the conveyor zone 201 is disposed. The first sensor element 13$a$ configured to capture conveyor data defined at least in part by conveyor angle data can include an angle sensor, an inertial measurement sensor, and/or any other sensor capable of generating sensor data indicative of an angle (e.g., relative to a horizontal plane, such as, for example, an at least substantially horizontal ground surface beneath the conveyor assembly 10).

Further, in various embodiments, an exemplary sensor device associated with a conveyor zone may include a sensor element configured to capture object data associated with an object being transported through a conveyor zone along a transportation path. For example, in various embodiments, as illustrated, an exemplary conveyor assembly 10 may comprise a second sensor element 13$b$ configured to capture object data including one or more of object speed data, object position data, object weight data, object size data, and/or the like. In various embodiments, a second sensor element 13$b$ may be configured to measure object speed data defined by the linear velocity at which the object is being moved along the transportation path 11 (e.g., by the conveyor belt 115 moving in the conveyance direction). Further, in various embodiments, one or more second sensor elements 13$b$ may additionally, and/or alternatively, be configured to measure object weight data defined by the measured weight of the object 1 disposed on the conveyor surface 115$a$. Further still, in various embodiments, one or more second sensor elements 13$b$ may additionally, and/or alternatively, be configured to measure object position data defined by the position of the object 1 within the conveyor zone 201, as defined relative to the length of the conveyor zone 201 (e.g., along the length of the conveyor surface 115$a$) and/or the conveyor end/dispense portion defined at the end of the conveyor zone 201. As an illustrative exemplary, the conveyor position data associated with the object 1 may be defined at least in part by a remaining distance the object 1 has within the conveyor zone 201 before it reaches the conveyor end/dispense portion defined by the conveyor zone 201 (e.g., the end of the conveyor surface 115$a$). Further still, in various embodiments, one or more second sensor elements 13$b$ may additionally, and/or alternatively, be configured to measure object size data defined by one or more measured dimensions (e.g., height, length, width) of the object 1 disposed on the conveyor surface 115$a$. In various embodiments, one or more sensor elements defined by the conveyor assembly 10 may embody an imaging device configured to capture sensor data (e.g., conveyor data and/or object data) associated with the conveyor zone and/or one or more objects 1 positioned therein. For example, in various embodiments, a sensor element embodying an imaging device may refer to any device, camera, sensor, and/or the like configured to detect the presence of an object 1 positioned near (e.g., within some threshold distance) of the imaging device and/or further capture, measure, and/or otherwise generate object data associated with the object 1 based at least in part on an image of the object 1 captured by the imaging device while the object 1 was positioned within the conveyor zone 201 (e.g., on the conveyor surface 115$a$).

In various embodiments, each of the one or more sensors of an exemplary conveyor assembly 10 associated with a conveyor zone 201 may be communicatively connected to a controller configured to control operation of the conveyor zone 201, as described herein. For example, in various embodiments, an exemplary controller may be configured to generate one or more control signals used to operate the conveyor zone 201 to control the transportation and/or stopping of an object 1 through and/or within the conveyor zone 201 based at least in part on sensor data received from one or more of the sensor elements (e.g., a first sensor element 13$a$, a second sensor element 13$b$) associated with the conveyor zone 201. For example, the first sensor element 13$a$ may be configured to transmit at least a portion of the captured conveyor data associated with the operational configuration defined by the conveyor surface 115$a$ to the controller associated with the conveyor assembly 10 in order to facilitate an execution of a stopping operation, as described herein. Further, the second sensor element 13$b$ may be configured to transmit at least a portion of the captured object data associated with the object 1 disposed on the conveyor surface 115$a$ to the controller associated with the conveyor assembly 10 in order to further facilitate the execution of the stopping operation, as described herein.

Figure 5A:
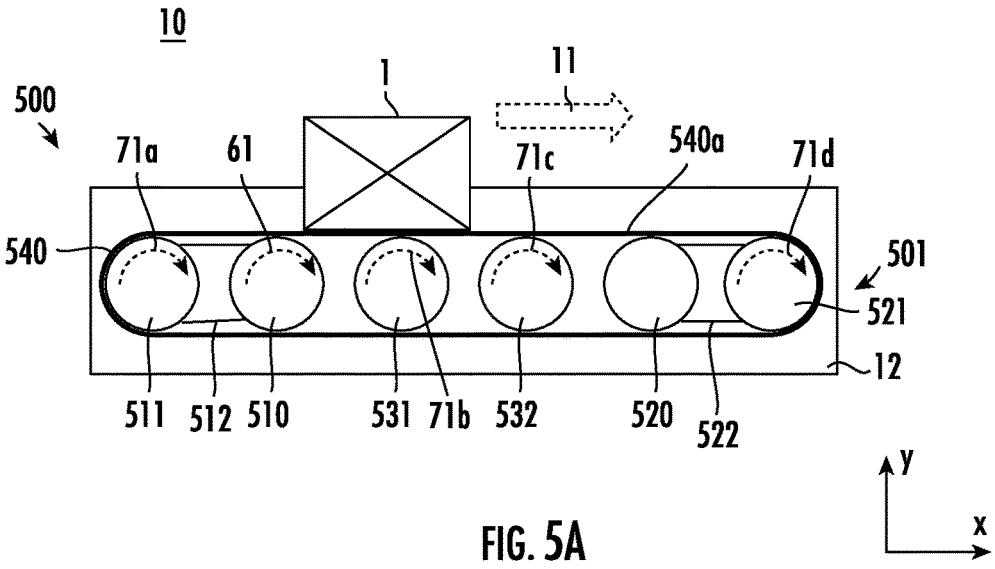
FIGS. 5A and 5B illustrate side cross-sectional views of an exemplary conveyor assembly in an operating condition and a stopping condition, respectively, according to example embodiments described herein.
Figure 5B:
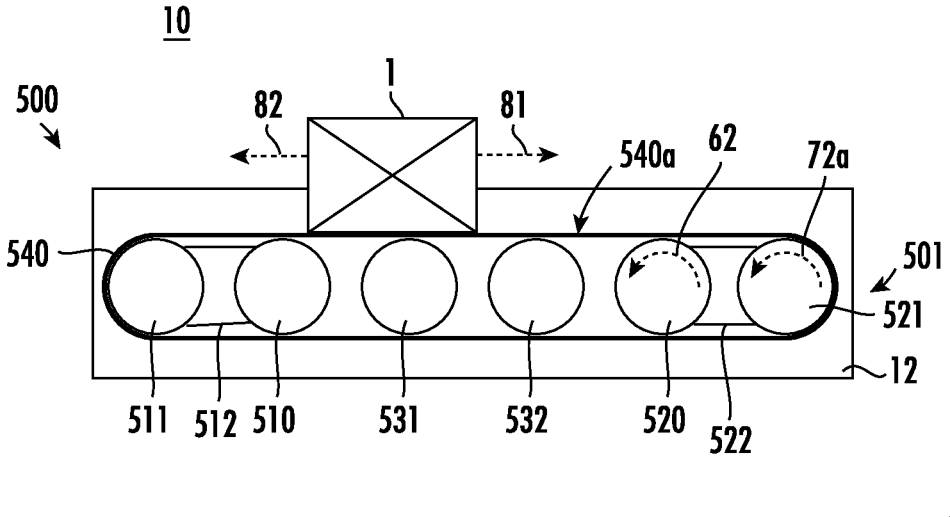

In various embodiments, an exemplary conveyor assembly may be defined in part by an exemplary conveyor zone defining at least a portion of a transportation path through which one or more objects may be transported based at least in part on a movement of a conveyor belt in a conveyance direction. As described herein, the movement of the conveyor belt defining the conveyor zone may be driven by a plurality of rollers engaged with the conveyor belt, such as, for example, a first drive roller, a second drive roller, and a plurality of idler rollers operatively connected to one or both of the drive rollers. For example, FIGS. 5A-5B illustrate side cross-sectional views of an exemplary conveyor assembly 10 in an operating condition and a stopping condition, respectively, according to example embodiments described herein. The exemplary conveyor zone 500 illustrated in FIGS. 5A and 5B is defined by a conveyor belt 520 engaged with the plurality of rollers 501 such that the selective rotation of at least a portion of the plurality of rollers 501 causes the conveyor belt 520 to move such that the conveyor surface 520$a$ defined by the conveyor belt is moved in a conveyance direction corresponding to the transportation path 11. As illustrated, the exemplary conveyor apparatus 10 may include a plurality of rollers 501 defined within a conveyor zone 500 that are operable in either an operating condition, wherein the conveyor surface 520$a$ of the conveyor belt 520 is moving in the conveyance direction (e.g., in the positive x-direction as defined in the exemplary orientation illustrated in FIGS. 5A and 5B) to facilitate transportation of one or more objects 1 disposed thereon along the transportation path 11, or a stopped condition, wherein the conveyor zone 500 is not in use and/or the conveyor belt 520 is otherwise at least substantially stationary such that the one or more objects 1 disposed on the conveyor surface 520$a$ remain positioned within the conveyor zone 500.

As illustrated, the exemplary conveyor zone 500 includes a plurality of rollers 501 comprising a first drive roller 510 and a first slave roller 511 operatively connected thereto, a second drive roller 520 and a second slave roller 520 operatively connected thereto, and a plurality of free-rotating idler rollers 531, 532 disposed within the conveyor zone 500 in between the first and second drive rollers 510, 520. In an exemplary circumstance in which the conveyor assembly 10 is being operated (e.g., by a controller associated with the conveyor assembly 10) in an operating condition, as illustrated in the exemplary embodiment shown in FIG. 5A, the first drive roller 510 may be selectively operated to drive a rotation 61 of the first drive roller 510 in the first rotational direction (e.g., in the clockwise direction as defined in the exemplary orientation illustrated in FIG. 5A). As illustrated, the first drive roller 510 may be operatively connected, such as, for example, via a secondary belt component 512, to a first slave roller 511 such that the rotation 61 of the first drive roller 510 drives a corresponding rotation 71*a* of the first slave roller 511 in the first rotational direction. As described herein, the first slave roller 511 may be physically engaged with the conveyor belt 540 defining the conveyor surface 540*a* of the conveyor zone 500 such that the corresponding rotation 71*a* thereof imparts a linear force on the conveyor belt 540 that causes the conveyor belt 540 to move in a direction corresponding to the rotation 71*a* of the first drive roller 511 engaged therewith. As illustrated, the rotation 71*a* of the first slave roller 511 in the first rotational direction may cause the conveyor belt 540 to move such that the conveyor surface 540*a* is moved in the conveyance direction, thereby facilitating a movement of the object 1 disposed on the conveyor surface 540*a* along the transportation path 11.

As illustrated, the free-rotating idler rollers 531, 532 of the set of rollers 501 within the conveyor zone 500 may exhibit corresponding rotations 71*b*, 71*c* in the first rotational direction based on the roller-driven movement of the conveyor surface 540*a* in the conveyance direction and a respective physical engagement of the conveyor belt 115 with each of the free-rotating idler rollers 531, 532. In various embodiments wherein the second drive roller 520 is configured for rotation in a second rotational direction opposite of the first rotational direction, the second drive roller 520 may remain nonoperational and function as a free-rotating roller while the conveyor assembly 10 (e.g., the conveyor zone 500) is in an operating condition. In such an exemplary circumstance, the second slave roller 521 operatively connected thereto may similarly function as a free-rotating idler roller when the conveyor assembly 10 is in an operational condition, exhibiting a rotation 71*d* in the first rotational direction that is driven by the movement of the conveyor surface 540*a* engaged therewith in the conveyance direction.

In various embodiments, the operation of an exemplary conveyor zone 500 exhibiting an operating condition (e.g., the exemplary conveyor zone 500 illustrated in FIG. 5A) may be halted based on a stopping of the movement of the conveyor belt 520 (e.g., the conveyor surface 520*a*) in the conveyance direction in order to pause, delay, stop, and/or otherwise disrupt the transportation of an object 1 disposed on the conveyor belt 520 along the transportation path 11. For example, an exemplary conveyor assembly 10 may be configured to execute a stopping operation by selectively stopping operation (e.g., rotation) of a first drive roller 510 of the plurality of rollers 501 defined with the conveyor zone 500 such that the conveyor belt 520 moving at a first linear velocity in the conveyance direction is at least substantially stopped (e.g., brought to a stationary position defined by a zero velocity). For example, a first drive roller 510 provided within a conveyor zone 500 may include a brake assembly (e.g., an internal brake assembly) configured to stop the rotation of the first drive roller 510 in response to one or more control signals received by the first drive roller 510 (e.g., a controller thereof). In various embodiments, an exemplary conveyor assembly 10 may be configured to execute a stopping operation within a conveyor zone 500, such as, for example, upon detection of a product flow jam within the conveyor assembly 10 (e.g., along a transportation path), by at least selectively activating the brake assembly defined by the first drive roller 510. For example, the brake assembly associated with the first drive roller 510 may be selectively activated to stop the rotation of the first drive roller 510 based on one or more control signals transmitted to the first driven roller 510 from a controller defined by the conveyor assembly 10.

As illustrated in FIG. 5B, in various embodiments wherein the plurality of rollers 501 within the conveyor zone 500 includes a first slave roller 511 operatively connected to the first drive roller 510 (e.g., via a secondary belt connection 512), stopping the rotation of the first driver roller 510 may similarly cause the first slave roller 511 to at least substantially stop rotating.

In various embodiments, upon the rotation of an operational first drive roller 510 being stopped (e.g., by an activated brake assembly associated therewith), the movement of the conveyor surface 540*a* defined by the conveyor belt 540 in the conveyance direction and the object 1 disposed thereon immediately prior to the initiation of the stopping operation (e.g., as the first drive roller 510 was rotating in the first rotational direction) may result in one or more inertial forces generated by the object 1 that acts on the conveyor surface 540*a* as the conveyor belt 540 is being stopped. As described herein, the inertial forces generated by the object disposed on the conveyor surface 540*a* during the stopping operation may impart a linear force on the conveyor surface 540*a* in the conveyance direction that causes conveyor belt 540 to move further in the conveyance direction such that the object 1 travels an additional distance along the transportation path 11 before the conveyor belt 540 is brought to a complete stop (e.g., during the execution of the stopping operation) For example, the conveyor belt 540 within the exemplary conveyor zone 500 is selectively adjusted from an operating condition to a stopped condition by bringing the conveyor belt 540 from an initial conveyance velocity to a complete stop. As the conveyor belt 540 is transitioning from the initial conveyance velocity to a complete stop (e.g., a zero velocity), the object 1 disposed on the conveyor surface 540*a* and/or the conveyor belt 540 itself may continue to move along the transportation path 11 for an additional stopping distance defined in the conveyance direction (e.g., in the positive x-direction as defined in the exemplary orientation illustrated in FIG. 5B). In various embodiments, as illustrated, one or more inertial forces 81 acting on the object 1 and/or the conveyor belt 540 may act to pull the object 1 further along the transportation path 11 relative to the position that the object 1 was in within the conveyor zone 500 (e.g., on the conveyor surface 540*a*) when the stopping operation was initiated (e.g., upon the stopping of the first drive roller 510).

In various embodiments, a second drive roller 520 may be selectively operated to cause the second slave roller 521 engaged with the conveyor belt 540 to rotate in a second rotational direction opposing the movement of the conveyor surface 540*a* in the conveyance direction in order to impart one or more counterforces on the conveyor belt 540 that at least partially counteract the inertial forces 81 defined by the object 1. For example, such an exemplary operation of the second drive roller 520 to drive the rotation of the second slave roller to oppose the movement of the conveyor surface 540*a* in the conveyance direction may enable an exemplary conveyor assembly 10 to execute a more efficient stopping operation within a conveyor zone 500 by counteracting the inertial forces generated by the object 1 in order to at least substantially minimize the additional stopping distance exhibited by the object 1 as the conveyor belt 540 is brought to a fully stopped condition. In various embodiments, an exemplary conveyor assembly 10 may be configured to execute a stopping operation by controlling the plurality of rollers 501 within the conveyor zone 500 such that the conveyor surface 540*a* that was initially moving in the conveyance direction at an initial conveyance velocity is brought to a complete stop with the object 1 disposed remaining positioned entirely within the conveyor zone 500 (e.g., on the conveyor surface 540*a*). That is, an exemplary conveyor zone 500 may be controlled (e.g., by a controller associated with the conveyor assembly 10) to execute a stopping operation by selectively controlling the rotation (e.g., the lack thereof) of a first drive roller 510 and the rotation 72*a* of the second roller 521 such that the conveyor surface 540*a* upon which the object 1 is disposed is brought to a complete stop prior to the object 1 reaching the conveyor end/dispense portion defined by the conveyor zone 500, such that the object 1 is stopped at a stopping position in which at least substantially the entire object 1 remains positioned within the conveyor zone 500 (e.g., on the conveyor surface 540*a*).

In various embodiments, an exemplary conveyor assembly 10 (e.g., a controller) may be configured to execute a stopping operation as described herein by generating one or more control signals to selectively operate a secondary motor defined by the second drive roller 520 operatively connected to the second roller 521 to cause the rotation 72*a* of the second roller 521 (e.g., to generate a counterforce acting on the conveyor belt 540 to counteract the inertial force of the object 1) at least substantially simultaneously with an activation of the brake assembly defined by the first drive roller 510 that stops the rotation of the first drive roller 510 in the first rotational direction (e.g., the rotation 61 of the first drive roller 510, as illustrated in FIG. 5A). Further, in various embodiments, the conveyor assembly 10 (e.g., a controller) may be configured to operate the secondary motor (e.g., the second drive roller 520) in order to drive the rotation 72*a* of the second roller 521 in the second rotational direction for a length of time and at a rotational speed that are determined (e.g., by the controller) to result in a counterforce 82 acting on the conveyor belt 540 that at least partially counteracts the inertial force 81 generated by the object 1, as described herein. As non-limiting examples provided for illustrative purposes, the operation of the secondary motor (e.g., the second drive roller 520) operatively connected to the second roller 521 may be based on captured sensor data defined by various operating characteristics of the conveyor zone 500 and/or the object 1 being transported therethrough, such as, for example, object weight, object speed, object size, object position, conveyor surface angle, and/or the like. For example, in various embodiments, the conveyor assembly 10 may be configured to cause the second roller 521 to exhibit a rotation 72*a* in the second rotational direction at a rotational speed of at least approximately between 20 rpm and 1000 rpm (e.g., between 100 rpm and 200 rpm).

Figure 5C:
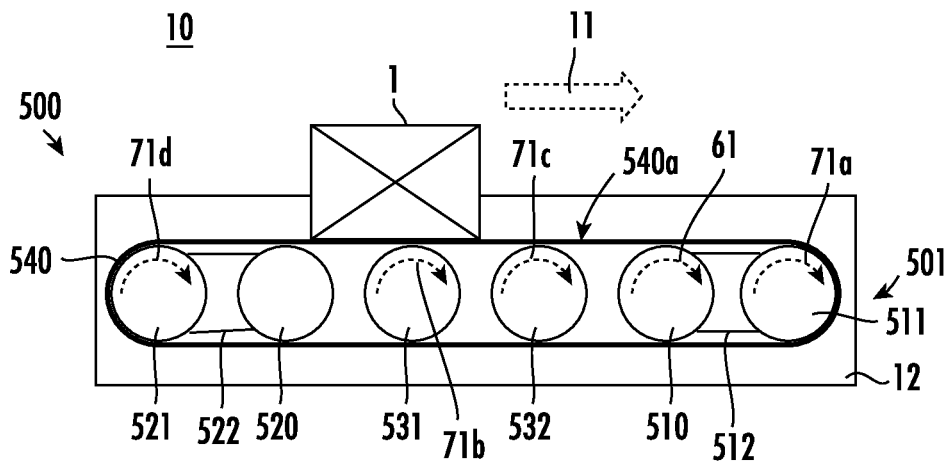
FIGS. 5C and 5D illustrate side cross-sectional views of an exemplary conveyor assembly in an operating condition and a stopping condition, respectively, according to example embodiments described herein.
Figure 5D:
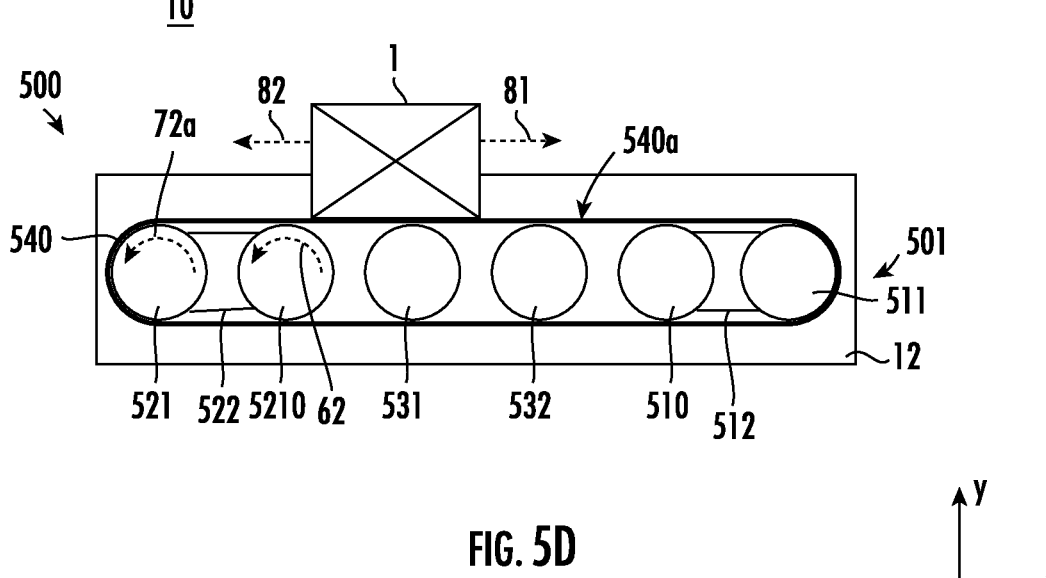

In various embodiments, the first drive motor configured to drive to movement of the conveyor surface in the conveyance direction may be positioned at a pushing end of the conveyor zone defined by an upstream position relative to at least a portion of the plurality of rollers within a conveyor zone such that rotating the first drive roller in the first rotational direction causes a linear force embodying a pushing force to be imparted on the conveyor surface. For example, the first drive roller 510 of the exemplary conveyor zone 500 illustrated in FIGS. 5A-5D is shown positioned at a pushing end of the conveyor zone 500 such that the rotation of the first drive roller 510 in the first rotational direction causes a linear pushing force to be imparted on the conveyor surface 540*a* that operably pushes the conveyor surface 540*a* in the conveyance direction. Further, in various embodiments, a first drive motor, as described herein, may be positioned at a pulling end of the conveyor zone defined by a downstream position relative to at least a portion of the plurality of rollers within a conveyor zone such that rotating the first drive roller in the first rotational direction causes a linear force embodying a pulling force to be imparted on the conveyor surface. For example, the first drive roller 510 of the exemplary conveyor zone 500 illustrated in FIG. 5C is shown positioned at a pulling end of the conveyor zone 500 such that the rotation of the first drive roller 510 in the first rotational direction causes a linear pulling force to be imparted on the conveyor surface 540*a* that operably pulls the conveyor surface 540*a* in the conveyance direction. In such an exemplary circumstance, as illustrated in FIG. 5D, the second slave roller 521 configured to be selectively rotated second motor (e.g., the second drive roller 520) in order to impart a counterforce on the conveyor surface 540*a* as part of a stopping operation may be positioned at the opposing end of the conveyor zone relative to the first drive roller 510 (e.g., the pushing end) such that the rotation of the second slave roller 521 in the second rotational direction causes a linear pushing force to be imparted on the conveyor surface 540*a* that opposes the inertial force acting on the conveyor surface 540*a* by pushing against the conveyor belt 540 defining the conveyor surface 540*a*.

Figure 6A:
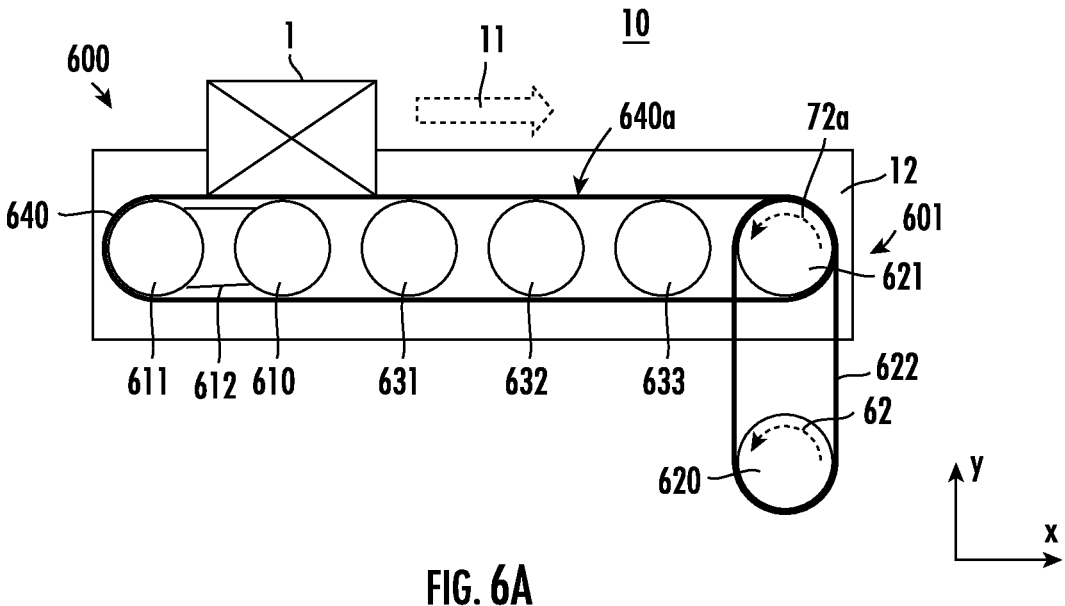
FIGS. 6A and 6B schematically illustrate side cross-sectional views of an exemplary conveyor assembly according to various embodiments described herein.
Figure 6B:
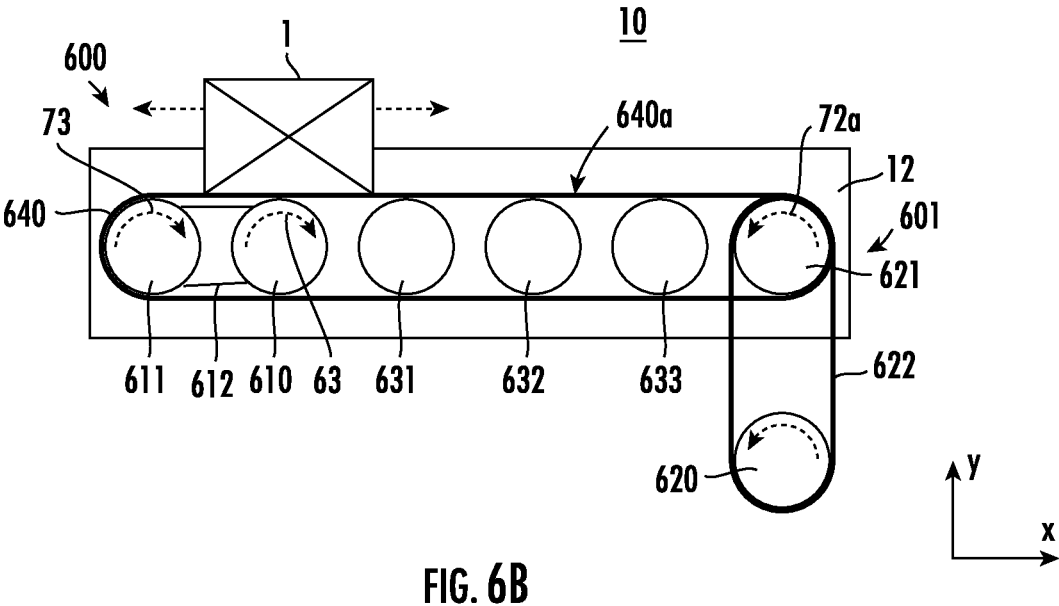

In various embodiments, the secondary motor that is operatively connected to the second roller of the plurality of rollers within a conveyor zone and configured for selective operation during a stopping operation to cause a rotation of the second roller that opposes the linear movement of the conveyor surface in order to generate a counterforce that counteracts an inertial force acting on the conveyor surface, as described above, may embody an external motor assembly. FIGS. 6A and 6B illustrate an exemplary conveyor assembly configured to use an external drive motor to selectively control one or more rollers engaged with a conveyor belt of an exemplary conveyor zone. As illustrated, the second slave roller 621 may be operatively connected to a secondary motor embodying an external motor assembly 620 via a secondary belt component 622 such that a selective rotation of the second slave roller 621 in the second rotational direction (e.g., in the counter-clockwise direction as defined in the exemplary orientation illustrated in FIGS. 6A and 6B) may be driven by operating the external motor 620 operatively connected thereto. For example, the rotation of a first slave roller 611 of the plurality of rollers 601 within the conveyor zone 600 may be stopped based on an actuation of an internal brake assembly defined by the first drive roller 610 that stops the rotation thereof. At substantially the same time, the external motor assembly 620 may be operated to cause the second slave roller 621 to rotate in the second rotational direction to generate a counterforce 82 that acts on the conveyor surface 640*a* in an opposing linear direction (e.g., in the negative x-direction as defined in the exemplary orientation illustrated in FIGS. 6A and 6B) opposite of the conveyance direction in which the inertial force 81 acts on the conveyor surface 640*a* to at least partially counteract the inertial force 81.

In various embodiments, as a secondary motor is being selectively operated to cause a counterforce to be imparted on a conveyor surface to counteract an inertial force acting on the conveyor surface (e.g., during and/or subsequent to the execution of a stopping operation, as described herein, an exemplary conveyor assembly may be configured to simultaneously operate the first drive roller in the first rotational direction to cause a balancing force to be imparted on the conveyor surface that opposes the counterforce acting thereon via the operation of the secondary motor. For example, during and/or subsequent to the execution of a stopping operation, the first drive roller may be selectively operated in order to impart a balancing force on the conveyor surface that is at least substantially equal and opposite to the counterforce acting thereon via the secondary motor. In such an exemplary configuration, the secondary motor and the first drive roller within a conveyor zone may be simultaneously operated to impart a counterforce and an equal and opposite balancing force, respectively, on the conveyor surface such that an object disposed on the conveyor surface in a stopped position (e.g., within the conveyor zone) may be at least substantially balanced in order to remain stationary until it is determined that the operation of the conveyor assembly (e.g., one or more drive rollers) to transport the object through the conveyor zone can continue.

For example, as illustrated in FIG. 6B, as the secondary motor 620 within a conveyor zone 600 is being selectively operated to cause a rotation 72a of the second slave roller 621 in a second rotational direction that imparts a counterforce 82 on the conveyor surface 640a (e.g., during and/or subsequent to the execution of a stopping operation), an exemplary conveyor assembly 10 may be configured to simultaneously operate the first drive roller 610 to drive a rotation 73 of the first slave roller 611 in the first rotational direction and cause a balancing force 83 opposing the counterforce 82 to be imparted on the conveyor surface 640a. For example, during and/or subsequent to the execution of a stopping operation, the first drive roller 610 may be selectively operated in order to impart a balancing force 83 on the conveyor surface 640a that is at least substantially equal and opposite to the counterforce 82 acting thereon via the rotation 72a of the secondary slave roller 621. In such an exemplary configuration, the secondary motor 620 operatively connected to the second slave roller 621 and the first drive roller 610 may be simultaneously operated to cause the counterforce 82 and the equal and opposite balancing force 83, respectively, to be imparted on the conveyor surface 640a such that the object 1 disposed on the conveyor surface 640a in a stopped position (e.g., within the conveyor zone 600) may be at least substantially balanced in order to remain stationary until it is determined that the operation of the conveyor assembly 10 (e.g., one or more drive rollers) to transport the object 1 through the conveyor zone 600 can continue. For example, secondary motor 620 and the first drive roller 610 may be selectively (e.g., simultaneously) operated to impart the counterforce 82 and the balancing force 83, respectively, on the conveyor surface 640a until a convey assembly 10 (e.g., one or more controllers communicatively connected to the first drive roller 610 and/or the secondary motor 620) determines that a product flow jam downstream from the conveyor zone 600, as defined along the transportation path 11, has been cleared.

Further, in various embodiments, the conveyor assembly 10 may be configured to cease operation of the secondary motor 620 and the first drive motor 610 and/or activate a brake assembly defined by the first drive roller 610 upon determining that a threshold amount of time has elapsed since the initiation of the first drive roller 611 operably imparting the balancing force 83 on the conveyor surface 640a without receiving a control signal to reinitiate a conveyance operation to further transport the object along the transportation path (e.g., that a downstream product flow jam has been cleared). As an illustrative example, as the first drive roller 610 is being selectively operated to impart a balancing force 83 on the conveyor surface 640a that counteracts the counterforce 82 being imparted thereon via the operation of the secondary motor 620, a controller of an exemplary conveyor apparatus 10 may be configured to determine that since the first drive roller 610 initiated rotation to impart the balancing force 83 on the conveyor surface 640a, an amount of time has elapsed that is greater than or equal to a predetermined threshold amount of time, and, in response, may generate one or more control signals configured to stop operation of the first drive roller and the second drive roller (e.g., and/or cause activation of the brake assembly associated with the first drive roller 610) such that the linear forces acting on the conveyance surface 640a from the plurality of rollers 601 in either the conveyance direction or the opposing direction are at least substantially eliminated. In various embodiments, the predetermined threshold amount of time may be defined by an amount of time needed to sufficiently balance the position of the object along the transportation path such that the forces acting on the conveyor surface in the conveyance direction and the opposing direction are at least substantially equal to one another. As a non-limiting example provided for illustrative purposes, in various embodiments, an exemplary conveyor assembly 10 may be configured such that the predetermined threshold amount of time described above is at least approximately 10 seconds.

Figure 7:
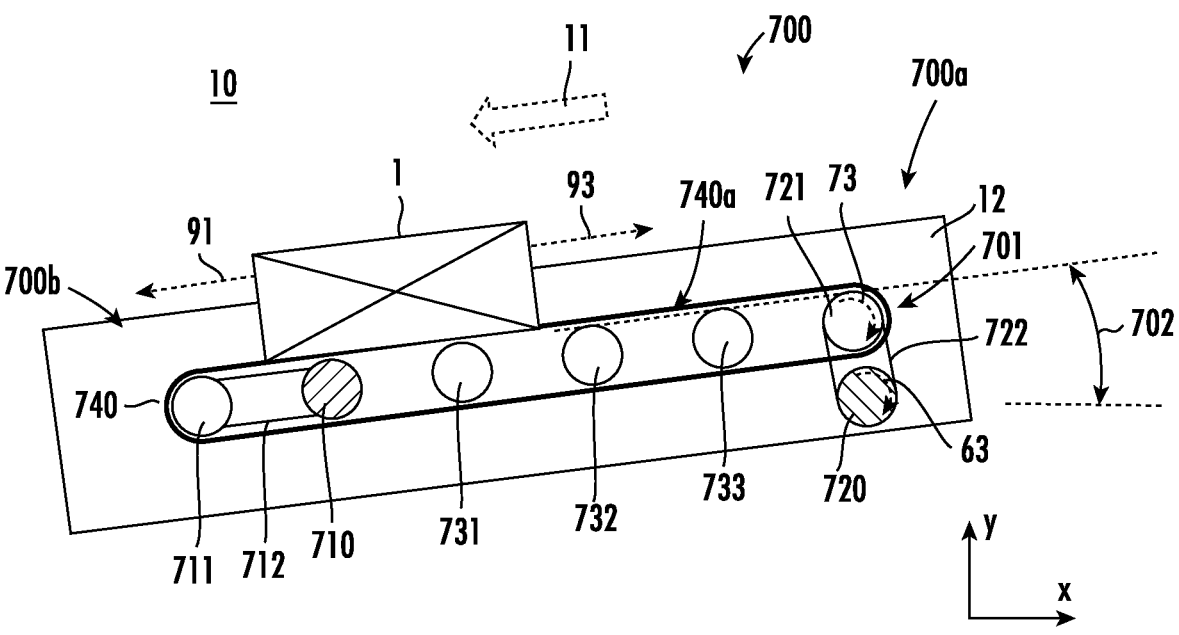
FIG. 7 schematically illustrates a side cross-sectional view of an exemplary conveyor assembly according to various embodiments described herein.

In various embodiments, an exemplary conveyor assembly may have one or more conveyor zones provided in an angled configuration relative to a horizontal ground surface such that the conveyor zone may be used as an incline zone and/or a decline zone depending on the conveyance direction defined by the conveyor belt during operation. For example, FIG. 7 schematically illustrates a side cross-sectional view of an exemplary conveyor assembly according to various embodiments described herein. In particular, FIG. 7 shows a conveyor zone 700 of an exemplary conveyor assembly 10 that is provided at an angled configuration such that the conveyor zone 700 functions as a decline zone within the conveyor assembly 10. As illustrated, the exemplary conveyor zone 700 defines a decline zone in which the conveyor surface 740a is arranged at an angle relative to an exemplary horizontal plane (e.g., in the x-z plane, as defined by the exemplary orientation illustrated in FIG. 7) such that a conveyor zone intake portion 700a of the conveyor zone 700 (e.g., the upstream-most portion of the conveyor surface 740a defined at the beginning of the conveyor zone 700, as defined relative to the transportation path 11) is positioned an initial first vertical height that is higher than a second vertical height defined by a conveyor zone dispense portion 700b of the conveyor zone 700 (e.g., the downstream-most portion of the conveyor surface 740a defined at the end of the conveyor zone 700, as defined relative to the transportation path 11). The conveyor zone 700 embodying a decline zone may be operable to transport an object 1 through the conveyor zone 700 by causing a movement of the downward-sloping conveyor surface 740a (e.g., via a control of one or more of the plurality of rollers 701 engaged therewith) such that the object 1 is moved along the transportation path towards the conveyor zone dispense portion 700b.

As illustrated, the angular configuration of the conveyor zone 700 may be defined by a conveyor angle 702 measured relative to an exemplary horizontal plane, such as, for example, an at least substantially horizontal ground surface upon which the conveyor assembly 10 is positioned. For example, the conveyor angle 702 defined by the decline zone 700 may be defined by the angle between the conveyor surface 740*a* of the conveyor belt 740 and an exemplary horizontal plane (e.g., at least substantially horizontal ground surface upon which the conveyor assembly 10 is positioned). In various embodiments, an exemplary conveyor surface 740*a* having an angular configuration (e.g., defined by conveyor angle 702) such that the corresponding conveyor zone 700 embodies a decline zone, as illustrated, may correspond to the inertial forces associated with an object 1 during a stopping operation, as described herein, being at least substantially greater than the corresponding forces generated by an object disposed on an at least substantially horizontal conveyor surface, such as, for example, the conveyor surface 540 of the exemplary conveyor zone 500 illustrated in FIGS. 5A and 5B. As such, an exemplary conveyor assembly 10 may be configured to account for the increased inertial forces generated by an object 1 disposed on the conveyor surface 740*a* of a decline zone 700 by adjusting one or more operational characteristics of the second motor 720 (e.g., a operational runtime, a rotational speed, and/or the like) during the stopping operation such that the counterforce generated by the rotation of the second roller 721 in the second rotational direction is similarly increased to counteract the increased inertial forces.

As illustrated in FIG. 7, the exemplary conveyor assembly 10 may be configured to execute a stopping operation by selectively stopping a rotation of the first drive roller 710 and (e.g., simultaneously) initiating an operation of the second motor 720 operatively connected to the second roller 721 (e.g., via a secondary belt component 722). The operation of the second motor 720 controlled by the conveyor assembly 10 (e.g., the controller) may be defined by an increased operational runtime and/or an increased rotational speed sufficient to drive a rotation of the second roller 721 that accounts for the increased inertial forces acting on the conveyor surface 740*a* from the object 1 by imparting an increased counterforce on the conveyor belt 740. For example, as described herein, in various embodiments, the controller of an exemplary conveyor assembly 10 may be configured to determine one or more operational characteristics by which the second motor 720 should be operated in order to drive a rotation 73 of the second roller 721 that is sufficient to generate an increased counterforce 93 to counteract the inertial force 91 defined by the object 1 and account for the increased inertial force 91 (e.g., acting on the conveyance surface 740*a* in the conveyance direction) caused by the conveyor angle 702 based at least in part on sensor data captured by one or more sensor elements of the conveyor assembly 10.

For example, the conveyor assembly 10 may be configured to account for the increased inertia forces caused by the conveyor angle 700*a* as the object 1 is being stopped within the decline zone 700 during a stopping operation. In various embodiments, a controller associated with the conveyor assembly 10 may be configured to transmit one or more control signals to the external motor 720 to drive the rotation of the second slave roller 721 (e.g., in the second rotational direction) for an increased rotation time and/or at an increased rotation speed in order to account for the increased inertial forces resulting from the angled configuration of the decline zone 700. As a non-limiting exemplary provided for illustrative purposes, in an exemplary circumstance wherein an exemplary conveyor assembly 10 (e.g., a controller) detects an object 1 having an object weight of 70 lbs. that is travelling through a decline conveyor zone 700 at an object speed of 180 fpm on a conveyor surface 740*a* defining a conveyor angle 702 of 16 degrees, the controller may be configured to determine that, in order to generate a counterforce sufficient to counteract the inertial force defined by the object 1, the second motor 720 should be operated to cause the second slave roller 721 to rotate in the second rotational direction for approximately two seconds. As a further non-limiting exemplary provided for illustrative purposes, in an exemplary circumstance wherein the exemplary conveyor assembly 10 (e.g., a controller) detects an object 1 having an object weight of 60 lbs. that is travelling through a decline conveyor zone 700 at an object speed of 150 fpm on a conveyor surface 740*a* defining a conveyor angle 702 of 10 degrees, the controller may be configured to determine that, in order to generate a counterforce sufficient to counteract the inertial force defined by the object 1, the second motor 720 should be operated to cause the second slave roller 721 to rotate in the second rotational direction for approximately one second.

Figure 8:
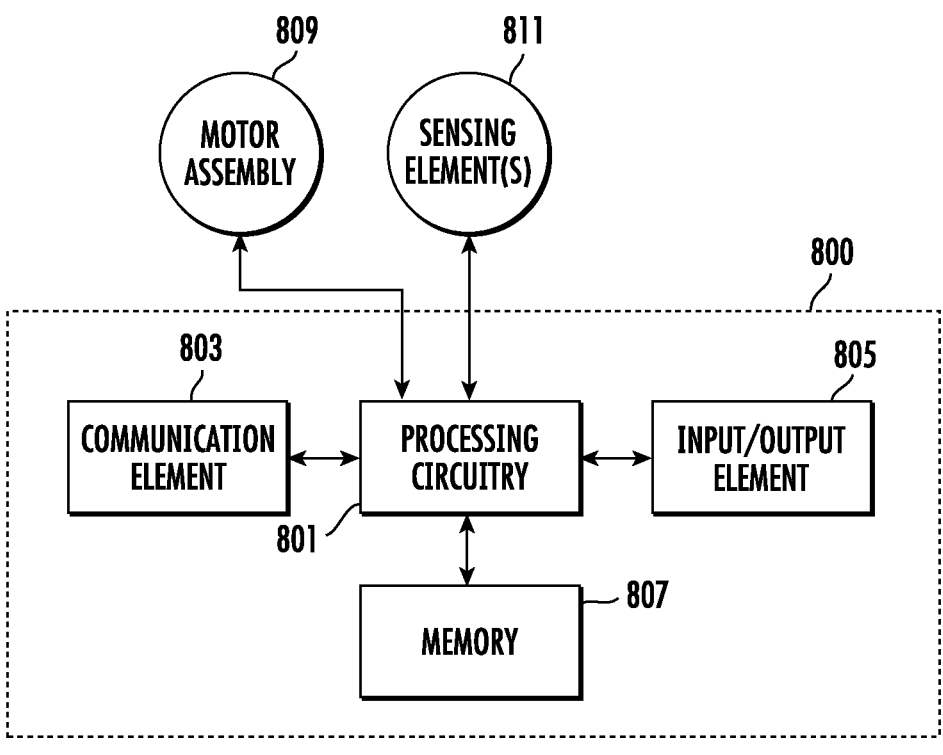
FIG. 8 illustrates an example controller component in electronic communication with various other components of an example conveyor assembly in accordance with various embodiments of the present disclosure.

Referring now to FIG. 8, a schematic diagram depicting an example controller component 800 in electronic communication with a motor assembly 809 and one or more sensing element(s) 811 associated with a conveyor zone of an exemplary conveyor assembly in accordance with various embodiments of the present disclosure is provided. As shown, the controller component 800 comprises processing circuitry 801, a communication element 803, input/output element 805, a memory 807 and/or other components configured to perform various operations, procedures, functions or the like described herein.

In some embodiments, the controller component 800 may be or comprise a PCB. In some examples, the controller component 800 (e.g., PCB) may further comprise one or more of a full bridge motor driver, a hall sensor, one or more thermal sensors, one or more user interfaces, one or more protection circuits, a wireless interface, sensing element circuitry (e.g., image sensor circuitry), an interface connector, power control circuitry, gate driver circuitry and/or the like.

The processing circuitry 801 may be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, but not limited to, an application specific integrated circuit (ASIC) or field programmable gate array (FPGA), or some combination thereof. Accordingly, although illustrated in FIG. 8 as a single processor, in an embodiment, the processing circuitry 801 may include a plurality of processors and signal processing modules. The plurality of processors may be embodied on a single electronic device or may be distributed across a plurality of electronic devices collectively configured to function as the circuitry of one or more drive rollers defined within an exemplary conveyor zone, such as, for example, the first drive roller 510 and/or the second drive roller 520, as illustrated in the exemplary embodiment shown in FIGS. 5A and 5B. The plurality of processors may be in operative communication with each other and may be collectively configured to perform one or more functionalities of the controller(s) as described herein. In an example embodiment, the processing circuitry 801 may be configured to execute instructions stored in the memory 807 or otherwise accessible to the processing circuitry 801. These instructions, when executed by the processing circuitry 801, may cause the exemplary conveyor assembly to perform one or more of the functionalities, as described herein, such as, for example, operating one or more drive rollers within a conveyor zone defined by the conveyor assembly. For example, in various embodiments, such exemplary instructions, when executed by the processing circuitry 801 of an exemplary controller 800, may cause the exemplary conveyor assembly to selectively operate one or more of a first drive roller and a secondary motor operatively connected to a second roller engage with a conveyor surface, each disposed within a conveyor zone, to control operation of the conveyor zone and execute a stopping operation by stopping the movement of the conveyor surface in the conveyance direction such that an object travelling thereon through the conveyor zone is stopped within the conveyor zone. For example. For example, the instructions may be utilized by a controller in communication with a first drive roller positioned within the conveyor zone to operate the first drive roller so as to cause a movement of the conveyance surface in a conveyance direction in order to transport the object disposed thereon along a transportation path defined within the conveyor zone. Further, in various embodiments, the instructions may be utilized by a controller in communication with a secondary motor operably connected to a second roller within the conveyor zone to initiate a stopping operation by selectively operating the secondary motor to drive a rotation of the second roller in a second rotational direction to generate a counterforce configured to act on the conveyor surface in order to facilitate a stopping thereof by counteracting an inertial force defined by the object disposed thereon.

Whether configured by hardware, firmware/software methods, or by a combination thereof, the processing circuitry 801 may include an entity capable of performing operations according to embodiments of the present disclosure while configured accordingly. Thus, for example, when the processing circuitry 801 is embodied as an ASIC, FPGA or the like, the processing circuitry 801 may include specifically configured hardware for conducting one or more operations described herein. Additionally, or alternatively, when the processing circuitry 801 is embodied as an executor of instructions, such as may be stored in the memory 807, the instructions may specifically configure the processing circuitry 801 to perform one or more algorithms and operations described herein, such as, for example, determining an inertial force associated with an object being transported through a conveyor zone executing a stopping operation, comparing the determined inertial force associated with the object to a threshold inertial force to determine whether the inertial force defined by the object is greater than the threshold inertial force (e.g., such that the controller should cause operation of a second motor to drive rotation of a second roller to generate a counterforce acting on the conveyor surface in order to facilitate the stopping of the object within the conveyor zone, as described herein).

Thus, the processing circuitry 801 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a combination thereof. The memory can also be located internal to another computing resource (e.g., enabling computer readable instructions to be downloaded over the Internet or another wired or wireless connection).

For example, the processing circuitry 801 may be configured to communicate with one or more motor assembly 809 defined by an exemplary conveyor assembly to control operation thereof. For example, in various embodiments, the one or more motor assembly 809 may be defined at least in part by a first drive roller disposed within a conveyor zone, such as, for example, the first drive roller 510 of the exemplary conveyor assembly 10 illustrated in FIGS. 5A-5B, that is communicatively connected with the controller 800 and configured to be operated based at least in part on one or more control signals received from the controller 800. Further, in various embodiments, in various embodiments, the one or more motor assembly 809 may be defined at least in part by a secondary motor that is communicatively connected with the controller 800 and operable (e.g., based at least in part on one or more control signals received from the controller 800) to drive a rotation of a second roller disposed within a conveyor zone to selectively generate a counterforce during a stopping operation, such as, for example, the second drive roller 520 of the exemplary conveyor assembly 10 illustrated in FIGS. 5A-5B and/or the second roller 620 of the exemplary conveyor assembly 10 illustrated in FIG. 6.

Further, as illustrated, the processing circuitry 801 may be configured to communicate with one or more sensing element(s) 811 defined by an exemplary conveyor assembly such that sensor data captured by the one or more sensor element(s) 811 (e.g., conveyor data associated with an operational configuration of the conveyor surface and/or object data associated with an object being transported through the conveyor zone) may be processed by the controller 800 to facilitate operation of the conveyor assembly according to various embodiments described herein.

The memory 807 may include suitable logic, circuitry, and/or interfaces that are adapted to store a set of instructions that is executable by the processing circuitry 801 to perform predetermined operations. Additionally or alternately, the memory 807 may be configured to store data/information, application programs, instructions, and etc., so that the controller component 800 can execute various functions according to the embodiments of the present disclosure. For example, in at least some embodiments, the memory 807 is configured to cache input data for processing by the processing circuitry 801. Thus, in at least some embodiments, the memory 807 is configured to store program instructions for execution by the processing circuitry 801. The memory 807 may store information in the form of static and/or dynamic information. When the functions are executed, the stored information may be stored and/or used by the controller component 800. Example memory implementations may include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the memory 807 may be integrated with the processing circuitry 801 on a single chip, without departing from the scope of the disclosure.

The communication element 803 may be implemented as any apparatus included in a circuit, hardware, a computer program product or a combination thereof, which is configured to receive and/or transmit data from/to another component or apparatus. The computer program product comprises computer-readable program instructions stored on a computer-readable medium (for example, the memory 807) and executed by a processing component 800 (for example, the processing circuitry 801). In some embodiments, the communication element 803 (as with other components discussed herein) may be at least partially implemented as the processing circuitry 801 or otherwise controlled by the processing circuitry 801. In this regard, the communication element 803 may communicate with the processing circuitry 801, for example, through a bus. The communication element 803 may comprise, for example, antennas, transmitters, receivers, transceivers, network interface cards and/or supporting hardware and/or firmware/software, and is used for establishing communication with another apparatus. The communication element 803 may be configured to receive and/or transmit any data that may be stored by the memory 807 by using any protocol that can be used for communication between apparatuses. The communication element 803 may additionally or alternatively communicate with the memory 807, the input/output element 805 and/or any other component of the processing component 800, for example, through a bus.

In some embodiments, the processing component 800 may comprise an input/output element 805. The input/output element 805 may communicate with the processing circuitry 801 to receive instructions input by the user and/or to provide audible, visual, mechanical or other outputs to the user. Therefore, the input/output element 805 may comprise supporting devices, such as a keyboard, a mouse, a display, a touch screen display, and/or other input/output mechanisms. Alternatively, at least some aspects of the input/output element 805 may be implemented on a device used by the user to communicate with the processing component 800. The input/output element 805 may communicate with the memory 807, the communication element 803 and/or any other component, for example, through a bus. One or a plurality of input/output modules and/or other components may be included in the processing component 800.

FIG. 9 is an example flow diagram illustrating a method of operating a shuttle assembly in accordance with various embodiments of the present disclosure. In various embodiments, the exemplary method 900 illustrated in FIG. 9 may be performed in reference to one or more embodiments depicted in FIGS. 1-8. In various embodiments, the steps of the exemplary method 900 shown in FIG. 9 (e.g., steps 902 and 904) may be performed sequentially (e.g., step 902 before step 904), while in other embodiments the steps may occur simultaneously (e.g., step 904 occurring concurrently with step 902) for the same or different conveyor zones and/or controllers of an exemplary conveyor assembly, or in any order necessary to achieve a desired outcome.

With reference to method 900 of FIG. 9, as depicted at step 902, a first drive roller may be operated to cause a movement of a conveyance surface in a conveyance direction. As described herein, an exemplary conveyor assembly may include a first drive roller disposed within a conveyor zone of the conveyor assembly. The first drive roller may be operated based on one or more control signals from a controller communicably connected thereto. For example, the controller may facilitate the operation of the conveyor zone by generating one or more control signals that cause the first drive roller to rotate in a first rotational direction in order to cause the conveyor surface of the conveyor zone to move in the conveyance direction. As described herein, a movement of the conveyor surface in the conveyance direction may be defined by a linear movement of the conveyor surface that results in an object disposed thereon being transported along a transportation path defined within the conveyor zone (e.g., from a conveyor zone intake portion towards a conveyor zone end portion).

In various embodiments, as shown at step 904, a stopping operation may be initiated to stop the movement of the conveyor surface in the conveyance direction by causing a second roller to rotate in a second rotational direction to generate a counterforce opposing the movement of the conveyor surface in the conveyance direction. For example, the second roller may embody an idler roller (e.g., a slave roller) engaged directly and/or indirectly with a conveyor surface (e.g., via the conveyor belt defining the conveyor surface) such that the second roller may be operated to generate a counterforce that acts on the conveyance surface to at least partially counteract an inertial force imparted on the conveyor surface from the object disposed thereon as the conveyor surface is stopped (e.g., during a stopping operation. For example, the selective rotation of the second roller may oppose the movement of the conveyor surface may be driven (e.g., by a second drive roller or an external motor assembly operably connected to the second roller) to impart a counterforce on the conveyor surface (e.g., the conveyor belt defining the conveyor surface) to counteract the inertial force acting thereon from the object in order to bring the conveyor surface to a complete stop while the object disposed thereon remains positioned within the conveyor zone.

In various embodiments, initiating a stopping operation may include activating a brake assembly defined by the first drive roller of a conveyor zone at least substantially simultaneously with the selective rotation of the second roller in the second rotational direction. For example, in such an exemplary circumstance, each of the stopped first drive roller and the second roller being driven in the second rotational direction are causing a respective force opposing the movement of the conveyor surface in the conveyance direction to be imparted on the conveyor surface in order to facilitate the stooping operation.

In various embodiments, the second roller may be rotated in the second rotational direction to oppose the movement of the conveyor surface in the conveyance direction based at least in part on one or more control signals generated by a controller of an exemplary conveyor assembly and transmitted to a motor assembly configured to drive the second roller, as described herein. For example, in various embodiments, the second roller being rotated in the second rotational direction may include a controller transmitting one or more control signals to a component of the conveyor assembly that is communicatively connected therewith and operably connected to the second roller such that an operation of the component (e.g., based on the one or more control signals) may cause the component to drive a rotation of the second roller in the second rotational direction, such as, for example, a second drive roller disposed within the conveyor zone and/or an external motor.

FIG. 10 is an example flow diagram illustrating a method of operating a shuttle assembly in accordance with various embodiments of the present disclosure. In various embodiments, the exemplary method 1000 illustrated in FIG. 10 may be performed in reference to one or more embodiments depicted in FIGS. 1-8. Further, in various embodiments, the exemplary method 100 illustrated in FIG. 10 may be performed in addition to, in conjunction with, and/or as part of the exemplary method 900 described in reference to FIG. 9. In various embodiments, the steps of the exemplary method 1000 shown in FIG. 10 (e.g., steps 1002, 1004, 1006, and 1008) may be performed sequentially (e.g., step 1002 before step 1004), while in other embodiments the steps may occur simultaneously (e.g., step 1006 occurring concurrently with step 1004) for the same or different conveyor zones and/or controllers of an exemplary conveyor assembly, or in any order necessary to achieve a desired outcome.

With reference to method 1000 of FIG. 10, as depicted at step 1002, sensor data associated with one or more of an operational configuration defined by a conveyor surface within a conveyor zone and an object disposed on a conveyor surface within the conveyor zone may be captured. As described herein, an exemplary conveyor assembly may include one or more sensor elements configured to capture data such as, for example, object data associated with an object disposed on a conveyor surface defined within a conveyor zone of the exemplary conveyor assembly, and/or conveyor data defined by an operational configuration associated with the conveyor zone. For example, the captured sensor data may be defined at least in part by conveyor data defined by an operational configuration of the conveyor zone, such as, for example, conveyor angle data corresponding to the angular configuration of the conveyor surface upon which an object within the conveyor zone is disposed, as defined by a conveyor angle measured relative to an at least substantially horizontal ground surface. As a further example, the captured sensor data may be defined in part by object data associated with the object being transported through the conveyor zone (e.g., on the conveyor surface), such as, for example, object speed data, object position data, object weight data, object size data, and/or the like.

In various embodiments, as shown at step 1004, the method 1000 may further include determining an inertial force associated with the object based at least in part on the sensor data. As described herein, an inertial force associated with an object disposed on a conveyor surface that is moving in a conveyance direction may be defined by the object weight, the initial object speed defined by the object prior to the initiation of the stopping operation (e.g., prior to the activation of a brake assembly configured to stop the rotation of the first drive roller), and the conveyor angle defined by the angle at which the conveyor surface within the conveyor zone is positioned (e.g., as measured relative to an exemplary horizontal plane).

In various embodiments, as shown at step 1006, the method 1000 may further include determining that inertial force associated with the object is greater than a threshold inertial force. In various embodiments, a threshold inertial force may be defined by the maximum inertial force that an object moving through the conveyor zone could define such that, upon stopping the movement of the conveyor surface in the conveyance direction by activating a brake assembly to stop the rotation of a first drive roller (e.g., upon an initiation of a stopping operation associated with the conveyor zone), the object would come to a stop at a stop position wherein the entirety of the object remains within the conveyor zone. That is, a determination that the inertial force associated with the object is greater than a threshold inertial force may correspond to a determination that, based at least in part on the operational configuration of the conveyor zone (e.g., a conveyor angle defined by the conveyor surface) and/or one or more object characteristics defined by the object (e.g., object weight, object size, object speed, object position, and/or the like), the inertial forces defined by the object would carry the object outside of the conveyor zone (e.g., beyond a conveyor zone end/dispense portion) during a stopping operation executed by stopping the rotation of the first drive roller (e.g., via the brake assembly corresponding thereto) without selectively generating an additional counterforce to counteract the movement of the conveyor surface.

In various embodiments, as shown at step 1008, upon determining that the inertial force associated with the object disposed on the conveyor surface within the conveyor zone is greater than the threshold inertial force, a secondary motor may be selectively operated to cause a second roller to rotate in a second rotational direction opposing the movement of the conveyor surface in order to impart a counterforce on the conveyor belt that at least partially (e.g., completely) counteracts the inertial force.

In various embodiments, in an exemplary circumstance wherein the inertial force is determined (e.g., by a controller) to be less than or equal to the threshold inertial force, executing a stopping operation associated with the conveyor zone defined by a conveyor assembly such that, upon the conveyor surface being stopped, at least substantially all of the object being conveyed through the conveyor zone remains disposed within the conveyor zone may include continuing to operate the conveyor assembly such that the second roller embodies an idler roller rotating in the first rotational direction based at least in part on the movement of the conveyor surface in the conveyance direction. That is, upon determining that the inertial forces associated with the object are not sufficient to cause the object disposed on the conveyor surface to be carried beyond the conveyor zone during a stopping operation controlled only through the first drive roller (e.g., by activating the brake assembly associated therewith), a controller may forego operating a secondary motor operably connected to the second roller to generate a counterforce, as described herein.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A conveyor assembly configured for transporting an object along a transportation path, the conveyor assembly comprising:

a plurality of rollers configured to facilitate transportation of the object disposed on a conveyor surface through a conveyor zone, wherein the plurality of rollers comprises:

a first drive roller selectively operable to rotate in a first rotational direction to cause a movement of the conveyor surface in a conveyance direction to move the object along the transportation path defined within the conveyor zone; and a second roller configured to be selectively rotated in a second rotational direction opposite the first rotational direction in order to generate a counterforce that opposes the movement of the conveyor surface in the conveyance direction; and a controller configured to generate one or more control signals configured to control the first drive roller and a secondary motor operable to drive rotation of the second roller in the second rotational direction;

wherein the conveyor assembly is configured to execute a stopping operation by stopping a first rotation of the first drive roller and initiating a second rotation of the second roller in the second rotational direction at substantially same time to stop the movement of the conveyor surface such that the object disposed thereon is stopped at a stop position defined within the conveyor zone.

2. The conveyor assembly of claim 1, wherein the conveyor surface is defined by a conveyor belt disposed within the conveyor zone, the conveyor belt being engaged with at least a portion of the plurality of rollers such that the first rotation of the first drive roller causes a first force to be imparted on the conveyor belt in a first linear direction and the second rotation of the second roller causes the counterforce to be imparted on the conveyor belt in a second linear direction opposite the first linear direction.

3. The conveyor assembly of claim 1, further comprising one or more sensor elements configured to capture sensor data associated with one or more of the object disposed on the conveyor surface and an operational configuration defined by the conveyor surface within the conveyor zone.

4. The conveyor assembly of claim 3, wherein the one or more sensor elements are configured to capture the sensor data comprising one or more of object speed data, object position data, object weight data, object size data, and conveyor angle data.

5. The conveyor assembly of claim 4, wherein the controller is configured to determine an inertial force associated with the object based at least in part on the sensor data.

6. The conveyor assembly of claim 5, wherein the controller is further configured to:
   compare the inertial force to a threshold inertial force; and
   upon determining that the inertial force is greater than the threshold inertial force, selectively operate the second roller.

7. The conveyor assembly of claim 1, wherein the plurality of rollers includes a second drive roller operably connected to the second roller, and wherein the second drive roller is communicably connected to the controller such that the controller is configured to cause the second roller to selectively rotate by selectively operating the second drive roller.

8. The conveyor assembly of claim 1, wherein the second roller is operably connected to an external motor assembly that is communicably connected to the controller such that the controller is configured to selectively rotate the second roller by selectively operating the external motor assembly.

9. The conveyor assembly of claim 1, wherein the conveyor assembly is further configured to execute the stopping operation by initiating a third rotation of the first drive roller in the first rotational direction to impart a balancing force on the conveyor surface that is at least substantially equal and opposite to the counterforce.

10. The conveyor assembly of claim 1, wherein the conveyor assembly is configured such that as the first drive roller is being operated to rotate in the first rotational direction, the second roller embodies a free-rotating idler roller such that the movement of the conveyor surface in the conveyance direction causes the second roller to rotate in the first rotational direction.

11. The conveyor assembly of claim 10, wherein the one or more control signals generated by the controller comprises a second motor activation signal configured to initiate an operation of the secondary motor such that the second roller embodies a slave roller controlled by the operation of the secondary motor during at least a portion of stopping operation.

12. The conveyor assembly of claim 1, wherein the first drive roller comprises an internal brake assembly, wherein the controller is configured to control the internal brake assembly of the first drive roller; and wherein executing the stopping operation comprises activating the internal brake assembly defined by the first drive roller to at least substantially stop the first drive roller from rotating in the first rotational direction.

13. The conveyor assembly of claim 1, wherein the plurality of rollers further comprises a first slave roller engaged with at least a portion of a conveyor belt defining the conveyor surface, the first slave roller being operably connected to the first drive roller such that rotation of the first drive roller in the first rotational direction results in a corresponding rotation of the first slave roller in the first rotational direction.

14. The conveyor assembly of claim 13, wherein the second roller defines a second slave roller operably connected to one of a second drive motor and an external motor assembly, the second slave roller being engaged with at least a second portion of the conveyor belt.

15. A method of operating a conveyor assembly, the method comprising:
   operating a first drive roller to cause a movement of a conveyor surface in a conveyance direction, wherein the conveyor surface is configured to move in the conveyance direction in order to transport an object disposed thereon along a transportation path defined within a conveyor zone; and
   initiating a stopping operation to stop the movement of the conveyor surface in the conveyance direction by causing a second roller engaged with a conveyor belt to rotate in a second rotational direction so as to at least partially counteract inertial forces associated with the object;
   wherein the second roller is operated such that the object disposed on the conveyor surface are stopped at a stop position defined within the conveyor zone.

16. The method of claim 15, further comprising capturing sensor data associated with one or more of an operational configuration defined by the conveyor surface within the conveyor zone and the object disposed on the conveyor surface.

17. The method of claim 16, wherein the sensor data captured by one or more sensor elements comprises one or more of object speed data, object weight data, object size data, and conveyor angle data.

18. The method of claim 16, further comprising determining an inertial force associated with the object based at least in part on the sensor data.

19. The method of claim 18, further comprising:
   comparing the inertial force associated with the object to a threshold inertial force; and
   upon determining that the inertial force is greater than the threshold inertial force, selectively operating a secondary motor to cause the second roller to rotate in the second rotational direction opposing the movement of the conveyor surface to stop the movement of the conveyor surface such that the object disposed thereon is stopped within the conveyor zone.

* * * * *